(12) United States Patent
Ohsawa et al.

(10) Patent No.: US 9,941,511 B2
(45) Date of Patent: Apr. 10, 2018

(54) ELECTRODE MATERIAL FOR NON-AQUEOUS ELECTROLYTE SECONDARY BATTERY, AND NON-AQUEOUS ELECTROLYTE SECONDARY BATTERY ELECTRODE AND NON-AQUEOUS ELECTROLYTE SECONDARY BATTERY USING THE SAME

(71) Applicant: NISSAN MOTOR CO., LTD., Yokohama-Shi, Kanagawa (JP)

(72) Inventors: Yasuhiko Ohsawa, Kanagawa (JP); Hideaki Horie, Kanagawa (JP); Hiroshi Akama, Kanagawa (JP); Yuki Kusachi, Kanagawa (JP); Yuta Murakami, Kyoto (JP); Kenichi Kawakita, Kyoto (JP); Yusuke Mizuno, Kyoto (JP); Yasuhiro Tsudo, Kyoto (JP); Yasuhiro Shindo, Kyoto (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 206 days.

(21) Appl. No.: 15/027,499

(22) PCT Filed: Oct. 3, 2014

(86) PCT No.: PCT/JP2014/076597
§ 371 (c)(1),
(2) Date: Apr. 6, 2016

(87) PCT Pub. No.: WO2015/053201
PCT Pub. Date: Apr. 16, 2015

(65) Prior Publication Data
US 2016/0260966 A1  Sep. 8, 2016

(30) Foreign Application Priority Data

Oct. 7, 2013 (JP) .................................. 2013-210562

(51) Int. Cl.
*H01M 10/00* (2006.01)
*H01M 4/36* (2006.01)
(Continued)

(52) U.S. Cl.
CPC ........... *H01M 4/366* (2013.01); *H01M 4/131* (2013.01); *H01M 4/139* (2013.01); *H01M 4/485* (2013.01);
(Continued)

(58) Field of Classification Search
CPC ..................................................... H01M 10/00
See application file for complete search history.

(56) References Cited

U.S. PATENT DOCUMENTS

2002/0061449 A1  5/2002  Maruo et al.
2007/0059600 A1  3/2007  Kim et al.
(Continued)

FOREIGN PATENT DOCUMENTS

CN    102341948 A    2/2012
JP    04-342966 A    11/1992
(Continued)

OTHER PUBLICATIONS

Takaya Sato, Kimiyo Banno, Tatsuya Maruo, Ryutaro Nozu; New design for a safe lithium-ion gel polymer battery; Journal of Power Sources; Dec. 1, 2005; vol. 152, pp. 264-271.

*Primary Examiner* — Jacob Marks
(74) *Attorney, Agent, or Firm* — Young Basile Hanlon & MacFarlane, P.C.

(57) ABSTRACT

A core-shell-type electrode material is used as an electrode active material layer of a non-aqueous electrolyte secondary battery, the core-shell-type electrode material having a core part in which at least a part of a surface of an electrode active material is coated with a first conductive material and a shell part in which a second conductive material is contained in a
(Continued)

base material formed by a gel-forming polymer having a tensile elongation at break of 10% or more in a gel state.

13 Claims, 4 Drawing Sheets

(51) Int. Cl.
    *H01M 4/131*     (2010.01)
    *H01M 4/139*     (2010.01)
    *H01M 4/62*     (2006.01)
    *H01M 10/0525*     (2010.01)
    *H01M 4/485*     (2010.01)
    *H01M 4/66*     (2006.01)

(52) U.S. Cl.
    CPC ........... *H01M 4/622* (2013.01); *H01M 4/624* (2013.01); *H01M 4/625* (2013.01); *H01M 4/66* (2013.01); *H01M 10/0525* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2011/0294007 A1 | 12/2011 | Hosaka et al. |
| 2013/0330619 A1* | 12/2013 | Archer ................. H01M 4/136 429/213 |
| 2014/0080003 A1 | 3/2014 | Tsuji et al. |
| 2015/0079475 A1 | 3/2015 | Yamamoto et al. |

FOREIGN PATENT DOCUMENTS

| | | |
|---|---|---|
| JP | 2003-003078 A | 1/2003 |
| JP | 2007-080827 A | 3/2007 |
| JP | 2008-311067 A | 12/2008 |
| JP | 2010-277959 A | 12/2010 |
| JP | 2013-069566 A | 4/2013 |
| JP | 2013-187023 A | 9/2013 |
| JP | 2013-191382 A | 9/2013 |
| WO | 2013-145721 A1 | 10/2013 |

* cited by examiner

MAGNIFICATION OF 5000

MAGNIFICATION OF 5000

MAGNIFICATION OF 5000

MAGNIFICATION OF 5000

ELECTRODE MATERIAL FOR NON-AQUEOUS ELECTROLYTE SECONDARY BATTERY, AND NON-AQUEOUS ELECTROLYTE SECONDARY BATTERY ELECTRODE AND NON-AQUEOUS ELECTROLYTE SECONDARY BATTERY USING THE SAME

CROSS REFERENCE TO RELATED APPLICATION

The present application is based on Japanese Patent Application No. 2013-210562 filed on Oct. 7, 2013, the entire content of which is herein incorporated by reference.

TECHNICAL FIELD

The present invention relates to an electrode material for a non-aqueous electrolyte secondary battery, and an electrode for a non-aqueous electrolyte secondary battery and a non-aqueous electrolyte secondary battery using the same.

BACKGROUND

Currently, a non-aqueous electrolyte secondary battery including a lithium ion secondary battery, which is used for a mobile device such as a mobile phone, is available as a commercial product. Further, in recent years, it is desired to reduce the amount of carbon dioxide in order to cope with the global warming. As such, a non-aqueous electrolyte secondary battery having small environmental burden has been used not only for a mobile device or the like but also for a power source device of an electric vehicle such as a hybrid vehicle (HEV), an electric vehicle (EV), or a fuel cell vehicle.

The non-aqueous electrolyte secondary battery generally has a configuration in which a positive electrode having a positive electrode active material or the like applied on a current collector and a negative electrode having a negative electrode active material or the like applied on a current collector are connected to each other via an electrolyte layer in which a non-aqueous electrolyte solution or a non-aqueous electrolyte gel is retained within a separator. Charging and discharging reactions of a battery occur by absorption and desorption of ions such as lithium ions on electrode active materials.

Herein, in an active material layer containing an electrode active material, in general, a binder (adhesive) is contained, and electrode active materials are bound to each other and come into close contact with the current collector. Further, a conductive aid is contained as necessary, and thus the conductivity of the active material layer is secured. For example, JP 4-342966 A discloses a technique that, when a negative electrode body formed by having lithium or an alkali metal containing lithium as a main component carried therein is used in a carbonaceous material that is a calcined body of an organic compound, carboxymethyl cellulose and styrene-butadiene rubber are concurrently used as a binder (adhesive) of the negative electrode body. Further, according to the disclosure of JP 4-342966 A, with such a configuration, it is possible to prevent the negative electrode body from coming off or prevent an internal short from occurring, and thus cycle characteristics in charge and discharge can be improved.

SUMMARY

However, as a result of the investigation of the present inventors, it is found that, in the related art in which a component contained in an active material layer is bound by use of a binder as in JP 4-342966 A, the internal resistance of a battery cannot be sufficiently decreased (the internal resistance increases) in some cases. If the internal resistance of the battery can be lowered, a high power density battery with excellent rate characteristics may be provided. For this reason, particularly in an in-vehicle battery in which it is assumed that charge and discharge are performed at a high current (high rate), a decrease (suppressing an increase) in the internal resistance of the battery is an urgent issue.

Under the circumstances, an object of the present invention is to provide a means that can minimize an increase in the internal resistance of a non-aqueous electrolyte secondary battery.

In order to achieve the object described above, according to an embodiment of the present invention, there is provided an electrode material for a non-aqueous electrolyte secondary battery, having a core part in which at least a part of a surface of an electrode active material is coated with a first conductive material and a shell part in which a second conductive material is contained in a base material formed by a gel-forming polymer having a tensile elongation at break of 10% or more in a gel state.

DETAILED DESCRIPTION OF THE EMBODIMENTS

Figure 1:
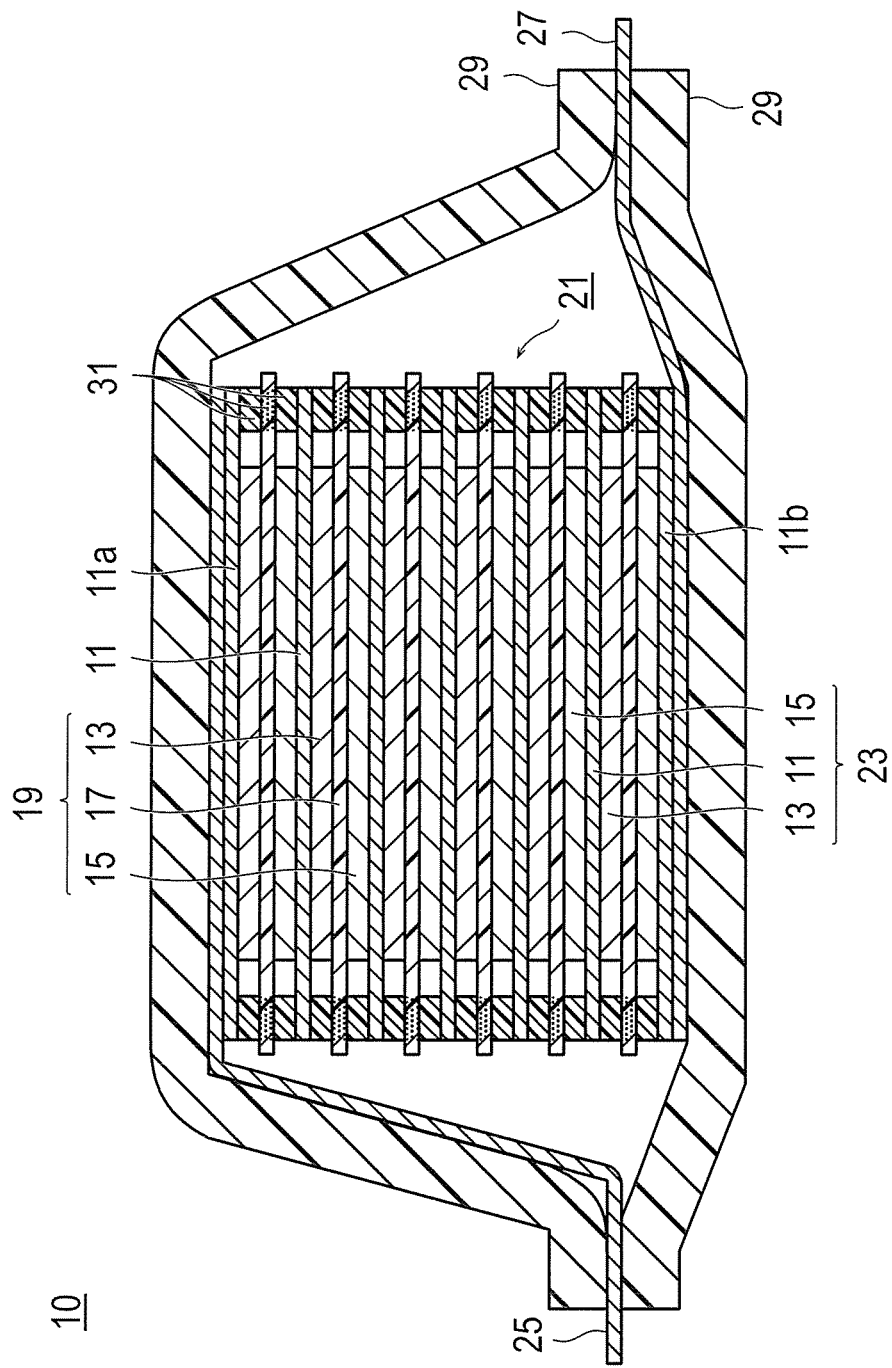
FIG. 1 is a cross-sectional view schematically illustrating a bipolar type secondary battery according to an embodiment of the present invention.

According to an embodiment of the present invention, there is provided an electrode material for a non-aqueous electrolyte secondary battery, having a core part in which at least a part of a surface of an electrode active material is coated with a first conductive material and a shell part in which a second conductive material is contained in a base material formed by a gel-forming polymer having a tensile elongation at break of 10% or more in a gel state.

According to the electrode material for a non-aqueous electrolyte secondary battery having the above-described configuration, the shell part containing a gel-forming polymer is present on the surface of the core part containing an electrode active material, and thus the conduction path of lithium ions from the surface of the electrode active material is secured. In addition, the electrode active material is coated with the conductive material and the conductive material is included in the gel-forming polymer, and thus the conduction path of electrons from the surface of the electrode active material is also secured. As a result, an increase in the internal resistance of the non-aqueous electrolyte secondary battery can be minimized.

The present inventors conducted intensive studies in view of the problems as described above (providing a means that can minimize an increase in the internal resistance of a non-aqueous electrolyte secondary battery). In the process, the present inventors considered that an increase in the internal resistance of a battery in the related art in which an active material layer contains a binder is caused by the following mechanism. That is, since the surface of the electrode active material is coated with an insulating thin film derived from a binder, it is difficult to sufficiently secure an electron conduction network from an electrode active material to a current collector and an ion conduction network toward a counter electrode. The present inventors set a hypothesis that an increase in the internal resistance of the battery occurs as a result. Also, this phenomenon was considered to be the same as in a case where only carboxymethyl cellulose is used as a binder (adhesive).

Regarding the hypothesis described above, the present inventors, first, employed a configuration in which at least a part of the surface of the electrode active material is coated with a conductive material in order to facilitate the transfer of electrons in the electrode active material and secure the electron conduction network from the electrode active material to the current collector. However, the present inventors found a problem that even when the configuration in which at least a part of the surface of the electrode active material is coated with a conductive material is employed, it is difficult to sufficiently suppress an increase of the internal resistance of the battery.

In addition, the present inventors tried disposing a shell part formed by a polymer which forms a gel by swelling of a liquid electrolyte (gel-forming polymer) and a conductive material on the surface of the core part formed by an electrode active material, based on a technical idea considerably different from the related art. Then, it has been confirmed that both the conduction paths of lithium ions and electrons on the surface of the electrode active material are secured and a certain effect is obtained for decrease in the internal resistance of the battery by such a countermeasure.

However, it is also found that, when the shell part formed by the gel-forming polymer and the conductive material is simply disposed around the core part, the effect of lowering the internal resistance is limited, and in some cases, the sufficient effect of lowering the internal resistance cannot be obtained. Further, the present inventors further examined the cause thereof, and found that, even when the shell part is formed, the breakage of the shell part is caused by expansion and shrinkage of the electrode active material accompanying charge and discharge of the battery, and as a result, the sufficient effect of lowering the internal resistance cannot be achieved in some cases. Based on these findings, the present inventors tried using a material having a certain level of flexibility as a base material (gel-forming polymer) constituting the shell part. Specifically, they confirmed that it is also possible to follow expansion and shrinkage of the electrode active material so that the shell part is less likely to be broken and the sufficient effect of lowering the internal resistance can be achieved when a gel-forming polymer having a tensile elongation at break of 10% or more in a gel state is used as the gel-forming polymer. Thus, the present invention is completed.

Hereinafter, while referring to the drawings, a description will be made of a preferred embodiment according to the present invention, but the technical scope of the present invention should be determined based on the scope of claims, and is not limited only to the following embodiments. Incidentally, the same reference numerals are assigned to the same elements in the description of the drawings, and duplicate descriptions are omitted. In addition, the scale of the drawings includes some exaggeration for descriptive reasons, and may thus be different from the actual dimension.

In the present specification, in some cases, a bipolar type lithium ion secondary battery is simply referred to as a "bipolar type secondary battery" and a bipolar type lithium ion secondary battery electrode is simply referred to as a "bipolar type electrode."

FIG. 1 is a cross-sectional view schematically illustrating a bipolar type secondary battery according to an embodiment of the present invention. A bipolar type secondary battery 10 illustrated in FIG. 1 has a configuration in which a power generating element 21 with a substantially rectangular shape, in which a charge and discharge reaction actually occurs, is sealed in the inside of a laminate film 29, which is a battery outer casing material.

As illustrated in FIG. 1, the power generating element 21 of the bipolar type secondary battery 10 according to this embodiment includes plural bipolar type electrodes 23 in which a positive electrode active material layer 13 electrically connected to one surface of a current collector 11 and a negative electrode active material layer 15 electrically connected to the other surface of the current collector 11 are formed. The respective bipolar type electrodes 23 are stacked on top of each other via electrolyte layers 17 to form the power generating element 21. Incidentally, the electrolyte layers 17 each have a configuration in which an electrolyte is held in the middle portion in the plane direction of a separator serving as a base material. At this time, the bipolar type electrodes 23 and the electrolyte layers 17 are alternately stacked in such a manner that the positive electrode active material layer 13 of one bipolar type electrode 23 faces the negative electrode active material layer 15 of another bipolar type electrode 23 adjacent to the one bipolar type electrode 23 via the electrolyte layer 17. That is, the electrolyte layer 17 is disposed to be interposed between the positive electrode active material layer 13 of one bipolar type electrode 23 and the negative electrode active material layer 15 of another bipolar type electrode 23 adjacent to the one bipolar type electrode 23.

The positive electrode active material layer 13, the electrolyte layer 17, and the negative electrode active material layer 15, which are adjacent to each other, constitute a single battery layer 19. Therefore, it can also be said that the bipolar type secondary battery 10 has a configuration in which the single battery layers 19 are stacked on top of each other. In addition, a sealing portion (insulating layer) 31 is provided on the periphery of each of the single battery layer 19. By this structure, liquid junction caused by leakage of an electrolyte solution from the electrolyte layer 17 is prevented and the contact between the current collectors 11 adjacent to each other inside the battery or occurrence of a short circuit caused by slight unevenness at the end portion of the single battery layer 19 in the power generating element 21 is prevented. Incidentally, the positive electrode active material layer 13 is formed on only one surface in an outermost layer positive electrode current collector 11a located on the outermost layer of the power generating element 21. Further, the negative electrode active material layer 15 is formed on only one surface in an outermost layer negative electrode current collector 11b located on the outermost layer of the power generating element 21.

Further, in the bipolar type secondary battery 10 illustrated in FIG. 1, a positive electrode current collecting plate 25 is disposed to be adjacent to the outermost layer positive electrode current collector 11a, and extends to be exposed on the outside of the laminate film 29, which is a battery outer casing material. Meanwhile, a negative electrode current collecting plate 27 is disposed to be adjacent to the outermost layer negative electrode current collector 11b and similarly extends to be exposed on the outside of the laminate film 29.

Incidentally, the number of the single battery layer 19 stacked is adjusted depending on a desired voltage. Further, the number of the single battery layer 19 stacked in the bipolar type secondary battery 10 may be minimized as long as sufficient output can be ensured even when the thickness of the battery is made thinner as much as possible. In order to prevent external damage at the time of operation and avoid environmental worsening, the bipolar type secondary battery 10 may also have a structure in which the power generating element 21 is sealed in the laminate film 29, which is a battery outer casing material under reduced pressure, and the positive electrode current collecting plate 25 and the negative electrode current collecting plate 27 are exposed on the outside of the laminate film 29. Incidentally, herein, the embodiment of the present invention has been described by using a bipolar type secondary battery as an example, but the type of a non-aqueous electrolyte battery to which the present invention can be applied is not particularly limited. The present invention can be applied to an arbitrary non-aqueous electrolyte secondary battery of the related art, such as a so-called parallel laminate type battery, in which single battery layers are connected in parallel in a power generating element.

Hereinafter, main constituent elements of the bipolar type secondary battery of this embodiment will be described.

<<Current Collector>>:

A current collector serves as a medium for transferring electrons from one side coming into contact with the positive electrode active material layer to the other side coming into contact with the negative electrode active material layer. The material for forming the current collector is not particularly limited, but, for example, a metal or a resin having conductivity may be used.

Specific examples of the metal include aluminum, nickel, iron, stainless steel, titanium, and copper. In addition to them, a clad material of nickel and aluminum, a clad material of copper and aluminum, or a plating material of a combination of those metals may be preferably used. Furthermore, a foil obtained by coating a metal surface with aluminum may be used. Among them, from the viewpoint of electron conductivity, potential for operating a battery, adhesiveness of a negative electrode active material to a current collector by sputtering, or the like, aluminum, stainless steel, copper, and nickel are preferable.

Further, examples of the latter resin having conductivity include a resin in which conductive filler is added to a conductive polymer material or a non-conductive polymer material as necessary. Examples of the conductive polymer material include polyaniline, polypyrrole, polythiophene, polyacetylene, polyparaphenylene, polyphenylene vinylene, and polyoxadiazole. Such a conductive polymer material has an advantage in simplification of the manufacturing process and lightness of a current collector since the conductive polymer material has sufficient conductivity even if a conductive filler is not added thereto.

Examples of the non-conductive polymer material include polyethylene (PE; high-density polyethylene (HDPE), low-density polyethylene (LDPE), or the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), or polystyrene (PS). Such a non-conductive polymer material may have excellent potential tolerance or solvent tolerance.

A conductive filler may be added to the conductive polymer material or the non-conductive polymer material as necessary. In particular, when a resin serving as a base material of a current collector only includes a non-conductive polymer, the conductive filler is essential to provide the resin with conductivity.

The conductive filler can be used without particular limitation as long as it is a material having conductivity. Examples of a material having excellent conductivity, potential tolerance, or lithium ion insulation include metal and conductive carbon. The metal is not particularly limited, but the metal preferably includes at least one kind of metal selected from the group consisting of Ni, Ti, Al, Cu, Pt, Fe, Cr, Sn, Zn, In, and Sb, or an alloy or metal oxide containing these metals. Further, the conductive carbon is not particularly limited. The conductive carbon preferably includes at least one material selected from the group consisting of acetylene black, Vulcan, Black Pearls, carbon nanofiber, Ketjen black, carbon nanotube, carbon nanohorn, and carbon nanoballoon.

The amount of the conductive filler added is not particularly limited as long as it can provide the current collector with sufficient conductivity. In general, the amount is about 5 to 35% by mass.

Incidentally, the current collector of this embodiment may be a single-layered structure formed by a single material or a stacked structure in which layers formed by these materials are appropriately combined. From the viewpoint of lightness of the current collector, it is preferable to contain at least a conductive resin layer formed by a resin having conductivity. In addition, from the viewpoint of interrupting the movement of lithium ions between single battery layers, a metal layer may be provided on a portion of the current collector.

<<Positive Electrode Active Material Layer>>:

The positive electrode active material layer 13 contains a positive electrode active material. The bipolar type secondary battery 10 according to this embodiment has a feature in the containing form of the positive electrode active material contained in the positive electrode active material layer 13.

Figure 2:
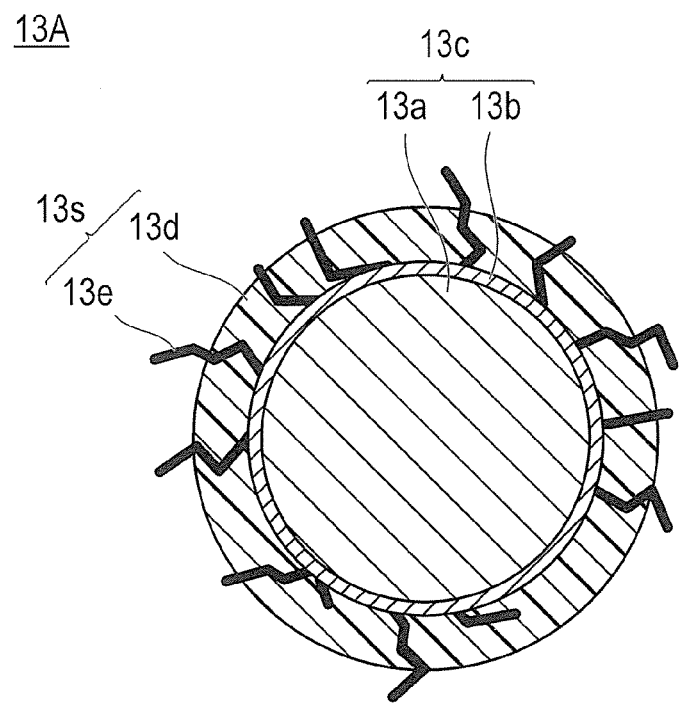
FIG. 2 is a cross-sectional view schematically illustrating an embodiment of a core-shell-type electrode material.

Specifically, in the bipolar type secondary battery 10 according to this embodiment, the positive electrode active material is contained in the positive electrode active material layer 13 in the form of a core-shell-type electrode material (core-shell-type positive electrode material) as illustrated in FIG. 2.

A core-shell-type positive electrode material 13A illustrated in FIG. 2 is configured by a core part 13c in which at least a part of the surface of a positive electrode active material 13a is coated with a first conductive material 13b and a shell part 13s with which the surface of the core part 13c is coated.

Further, this core part 13c has a configuration in which a metal oxide (for example, $LiCoO_2$) as the positive electrode active material 13a is coated with a carbon material as the first conductive material 13b. Incidentally, in FIG. 2, the entire surface of the positive electrode active material 13a is coated with the first conductive material 13b, but as detailed later, a part of the surface of the positive electrode active material 13a may be exposed and come into direct contact with a base material 13d (the details thereof will be described later).

Further, the shell part 13s has a configuration in which an acetylene black 13e as the second conductive material is contained in the base material 13d formed by a predetermined polyethylene glycol-based polyurethane resin. Incidentally, in FIG. 2, the entire surface of the core part 13c is coated with the shell part 13s, but a part of the surface of the core part 13c may be exposed. In a preferred embodiment, 50% by area or more of the surface of the core part 13c is preferably coated with the shell part 13s, more preferably 60% by area or more thereof, further preferably 70% by area or more thereof, particularly preferably 80% by area or more thereof, and most preferably 90% by area or more thereof (upper limit: 100% by area).

Further, the mass ratio of the shell part 13s to the core part 13c is not particularly limited, but the shell part 13s is preferably 2 to 30 parts by mass, and more preferably 5 to 15 parts by mass relative to 100 parts by mass of the core part 13c.

Hereinafter, the details of the core part 13c and the shell part 13s will be described by illustrating, as an example, a case where the core-shell-type electrode material according to the present invention is a positive electrode material. However, as described later, the present invention can be applied as a negative electrode material.

<<Core Part 13c>>:

In this embodiment, the core part 13c contains the positive electrode active material 13a and the first conductive material 13b.

The surface of the positive electrode active material 13a according to this embodiment is coated with (supports) the first conductive material 13b.

Incidentally, in the present specification, "coat" or "support" means that the first conductive material is chemically or physically bound to at least a portion of the surface of the electrode active material. Further, it can be confirmed that the surface of the electrode active material is coated with the first conductive material by observing the produced electrode active material or an electrode active material extracted (separated) from the electrode using a well-known means such as a scanning electron microscope (SEM). That is, it can be confirmed by performing observation of electrode active material in a state in which the first conductive material adheres to the active material particle, by means of an SEM image or the like.

Herein, the coating ratio (support ratio) of the positive electrode active material 13a by the first conductive material 13b is not particularly limited. In consideration of the effect of improving battery characteristics and conductivity, the coating ratio (support ratio) of the positive electrode active material 13a by the first conductive material is preferably 20% by area or more, more preferably 50% by area or more, and still more preferably 75% by area or more (upper limit: 100% by area).

In the present specification, as the "coating ratio (support ratio) of the active material by the conductive material," a value measured and calculated by Auger electron spectroscopy is employed.

Herein, the method of controlling the coating ratio (support ratio) with respect to the positive electrode active material 13a by the first conductive material 13b to the above-described preferable range is not particularly limited. Specifically, a method can be used in which the positive electrode active material 13a and the first conductive material 13b or a raw material of the first conductive material 13b are mixed at an appropriate ratio, the resultant mixture is then physically or chemically treated, and the first conductive material 13b is chemically or physically bound to (applied to) the surface of the positive electrode active material 13a.

In the above-described method, the mixing ratio of the positive electrode active material 13a and the first conductive material 13b (or a raw material of the first conductive material 13b) is not particularly limited. Specifically, when the total amount of the positive electrode active material 13a and the first conductive material 13b (or a raw material of the first conductive material 13b) is considered as 100 parts by weight, the first conductive material 13b (or a raw material of the first conductive material 13b) is mixed at a ratio of preferably 0.1 to 50 parts by weight. More preferably, in the above-described method, the first conductive material 13b (or a raw material of the first conductive material 13b) is mixed with the positive electrode active material 13a at a ratio of 1 to 25 parts by weight. When such a mixing ratio is used, the coating ratio (support ratio) with respect to the positive electrode active material 13a by the first conductive material 13b can be easily controlled to the above-described preferable range.

Hereinafter, the positive electrode active material 13a and the first conductive material 13b which form the core part 13c will be described in detail, respectively.

<<Positive Electrode Active Material 13a>>:

The positive electrode active material 13a has a composition which absorbs ions during discharge and desorbs ions during charge.

As the positive electrode active material 13a, a metal oxide is preferably used. In general, from the viewpoint of battery characteristics (capacity), the metal oxide is practicable as a positive electrode active material. However, when a metal oxide is used as an active material, the metal oxide does not have a high compatibility with a gel-forming polymer constituting the shell part, and thus the adhesive force may not be sufficiently obtained in some cases. On the other hand, in this embodiment, since the surface of the positive electrode active material is coated with the first conductive material, the adhesion property of the gel-forming polymer to the positive electrode active material can be improved. Therefore, in terms of the fact that the effect obtained by using the first conductive material is significantly exhibited, a metal oxide is used as a positive electrode active material, which is a preferred embodiment in the present invention.

Preferred examples of a metal oxide which is used as a positive electrode active material include $LiMn_2O_4$, $LiCoO_2$, $LiNiO_2$, $LiFeO_2$, $Li_4Ti_5O_{12}$, $Li(Ni-Mn-Co)O_2$, and lithium-transition metal composite oxide, such as a compound in which a part of these transition metals is replaced with another element, a lithium-transition metal phosphate compound such as $LiFePO_4$, and a lithium-transition metal sulfate compound. In some cases, two or more kinds of the positive electrode active material may be concurrently used. From the viewpoint of capacity and output characteristics, lithium-transition metal composite oxide and a lithium-transition metal phosphate compound are preferably used as a positive electrode active material. A composite oxide containing lithium and nickel is more preferably used, and Li(Ni—Mn—Co)O$_2$ and a composite oxide in which part of these transition metals is replaced with another element (hereinafter, simply referred to as "NMC composite oxide") is further preferably used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M, and extractable Li amount is twice the amount of spinel lithium manganese oxide, that is, as the supply power is two times higher, it can have high capacity.

As described above, the NMC composite oxide also includes a composite oxide in which a part of transition metal element is replaced with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC composite oxide preferably has a composition represented by General Formula (1): Li$_a$Ni$_b$Mn$_c$Co$_d$M$_x$O$_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Co, d represents the atomic ratio of Mn, and x represents the atomic ratio of M. From the viewpoint of the cycle characteristics, it is preferable that $0.4 \leq b \leq 0.6$ in General Formula (1). Incidentally, the composition of each element can be measured by induction coupled plasma (ICP) spectroscopy.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice.

As a more preferred embodiment, from the viewpoint of improving a balance between capacity and lifetime characteristics, it is preferable that b, c, and d in General Formula (1) be $0.49 \leq b \leq 0.51$, $0.29 \leq c \leq 0.31$, and $0.19 \leq d \leq 0.21$. For example, as compared with LiCoO$_2$, LiMn$_2$O$_4$, LiNi$_{1/3}$Mn$_{1/3}$Co$_{1/3}$O$_2$, and the like that exhibit actual performance in a general consumer use battery, LiNi$_{0.5}$Mn$_{0.3}$Co$_{0.2}$O$_2$ has a large capacity per unit weight, and thus has an advantage that a compact battery having a high capacity can be produced since the energy density can be improved. In addition, from the viewpoint of a cruising distance, LiNi$_{0.5}$Mn$_{0.3}$Co$_{0.2}$O$_2$ is preferable. Incidentally, in terms of having a larger capacity, LiNi$_{0.8}$Co$_{0.1}$Al$_{0.1}$O$_2$ is more advantageous, but may have a problem in lifetime characteristics. On the other hand, LiNi$_{0.5}$Mn$_{0.3}$CO$_{0.2}$O$_2$ has lifetime characteristics as excellent as LiNi$_{1/3}$Mn$_{1/3}$Co$_{1/3}$O$_2$.

Incidentally, it is needless to say that a positive electrode active material other than the aforementioned positive electrode active material may be used. In addition, the average particle diameter of the positive electrode active material contained in the positive electrode active material layer (in the case of a core-shell-type electrode material, the average particle diameter of a portion of the core part excluding the first conductive material) is not particularly limited, but from the viewpoint of having higher output power, the average particle diameter is preferably 1 to 100 μm, and more preferably 1 to 20 μm.

<<First Conductive Material 13b>>:

Regarding the first conductive material 13b with which the positive electrode active material 13a is coated, any materials may be used as long as at least a part of the surface of the positive electrode active material 13a can be coated with them and have conductivity. That is, it is sufficient that the first conductive material 13b can form a conductive path between the core part 13c and the surface of the electrode material (the outer surface of the shell part 13s).

Examples of the first conductive material 13b include a carbon material, a conductive metal oxide, a metal, conductive ceramic, and a conductive polymer.

Among these materials described above, the first conductive material 13b is preferably a carbon material. The positive electrode active material 13a can strongly hold the base material formed by the gel-forming polymer via a carbon material by compatibility between the gel-forming polymer constituting the shell part and the carbon material. That is, the core part 13c and the shell part 13s are strongly attached to each other. Therefore, it is possible to provide an electrode material with a stable structure. Further, even when the conductivity of the positive electrode active material 13a itself is low, by coating positive electrode active material 13a with the carbon material, the conductivity of the core part 13c can be improved due to the conductivity of the carbon material.

Hereinafter, the carbon material will be described in detail.

<<Carbon Material>>:

The carbon material as the first conductive material 13b is not particularly limited, and any carbon materials may be used as long as at least a part of the surface of the positive electrode active material 13a can be coated with them. For example, the carbon material may be the same carbon material to be used as a conductive aid (an additive to be blended for improving the conductivity of the electrode active material layer).

Specific examples thereof include acetylene black, furnace black, carbon black, channel black, and graphite. Among these, from the viewpoint of maintaining the coating of the carbon material by suppressing Li ion insertion/removal, the carbon material preferably has low crystallinity, and acetylene black is more preferably used.

Further, the carbon material to be used may be appropriately changed depending on a method used when the active material is coated with the carbon material. Therefore, depending on a coating method of the carbon material to the active material, a carbon material other than those described above may be used. For example, in a case where coating is performed by a sintering method to be detailed later, a water-soluble polymer such as polyvinyl alcohol or sucrose is preferably used as a carbon source (that is, a raw material of the carbon material) for coating the active material. Of them, polyvinyl alcohol is preferable.

The shape of the carbon material (the shape thereof in a state in which the active material is coated with the carbon material) is also not particularly limited, a particulate form or a fibrous form may be employed. From the viewpoint of ease of coating, a particulate form is preferable, and from the viewpoint of conductivity, a fibrous form is preferable. The size of the carbon material is also not particularly limited. For example, when the carbon material is in a particulate form, the average particle diameter (secondary particle diameter) thereof is preferably 10 to 200 nm, and more preferably 20 to 150 nm. Further, when the carbon material is in a fibrous form, the diameter thereof is preferably 20 to 500 nm, and more preferably 50 to 300 nm, and the length thereof is preferably 5 to 20 μm, and more preferably 8 to 15 μm. With such a size, the surface of the active material is easily coated with the carbon material. In addition, with such a size, the surface of the active material is uniformly coated with the carbon material.

<<Coating Method of Carbon Material>>:

In particular, the coating method of the positive electrode active material 13a when the first conductive material 13b is a carbon material will be described. Regarding the coating method, a physical or chemical treatment method for chemically or physically binding (coating) the carbon material to the surface of the positive electrode active material 13a is not particularly limited, and examples thereof include a method of embedding at least a part of the carbon material in the positive electrode active material 13a by shearing and a method of chemically binding the positive electrode active material 13a and the surface of the carbon material to each other via functional groups thereof. More specifically, a sintering (calcining) method, a mechanochemical method (surface treatment by a hybridizer), a liquid phase method, a vapor deposition (CVD) method, or the like can be used. Among these, a sintering (calcining) method and a mechanochemical method are preferably used.

The physical or chemical treatment condition for chemically or physically binding (coating) the carbon material to the positive electrode active material 13a is not particularly limited, but can be appropriately selected by a method to be used.

Hereinafter, as a preferable means as a method of coating the carbon material of this embodiment, two methods will be described in detail.

<<Sintering (Calcining) Method>>:

When the sintering (calcining) method is used, specifically, preparation is preferably performed through the following steps. That is, first, an aqueous solution of a water-soluble polymer is prepared (step 1). Next, the positive electrode active material 13a is dispersed in the water-soluble polymer aqueous solution prepared in step 1 described above (step 2). Then, water is evaporated from the aqueous solution prepared in step 2 described above, and a solid thus obtained is dried (step 3). Further, the solid obtained in step 3 described above is calcined (step 4). In this way, through steps 1 to 4, it is possible to obtain the positive electrode active material 13a coated with a carbon material (that is, the core part 13c).

The concentration of the water-soluble polymer in the water-soluble polymer aqueous solution in step 1 described above is not particularly limited, but is preferably 0.1 to 50 parts by weight, preferably 1 to 30 parts by weight, and particularly preferably 1.5 to 10 parts by weight relative to 100 parts by weight of water. In addition, when the water-soluble polymer aqueous solution is prepared, the aqueous solution may be prepared while being heated. At this time, the temperature of the aqueous solution is not particularly limited, and is preferably 40 to 98° C., and particularly preferably 50 to 95° C.

In step 2 described above, the positive electrode active material 13a is preferably dispersed while the water-soluble polymer aqueous solution is stirred. At this time, the amount of the positive electrode active material 13a to be dispersed in the water-soluble polymer aqueous solution is not particularly limited, but is preferably 0.1 to 50 parts by weight, preferably 1 to 30 parts by weight, and particularly preferably 5 to 20 parts by weight relative to 100 parts by weight of the water-soluble polymer aqueous solution. Further, the weight ratio of the water-soluble polymer used in step 1 described above to the positive electrode active material 13a is not particularly limited, but is preferably 1:99 to 99:1, more preferably 5:85 to 85:5, and further preferably 8:92 to 92:8. Incidentally, when the positive electrode active material 13a is dispersed in the water-soluble polymer aqueous solution, the aqueous solution may be prepared while being heated. At this time, the temperature of the aqueous solution is not particularly limited, but is preferably 40 to 98° C., and particularly preferably 50 to 95° C.

In step 3 described above, in order to efficiently evaporate water from the water-soluble polymer aqueous solution which is prepared in step 2 described above and in which the positive electrode active material 13a is dispersed, it is preferable to heat the aqueous solution while being stirred. At this time, the heating temperature is not particularly limited as long as it is a temperature at which water is evaporated. After almost the whole amount of water is evaporated, it is preferable to further dry the obtained solid. The drying method used at this time is not particularly limited, and methods such as natural drying, a reduced-pressure drying method, and an air-blow drying method can be used. Further, the drying temperature is not particularly limited, but is preferably 100 to 180° C., and more preferably 110 to 160° C.

In step 4 described above, the solid (a raw material of the sintered body) obtained in step 3 described above can be calcined by using a well-known calcining (sintering) device such as an electric furnace or a belt furnace. By performing calcination in the present step 4, it is possible to coat at least a part of the surface of the positive electrode active material 13a with the carbon material. At this time, the calcining temperature is not particularly limited, but is preferably 200 to 1000° C., more preferably 300 to 800° C., and particularly preferably 350 to 500° C. Further, the calcining time (heating time) is also not particularly limited, but is preferably 10 minutes to 5 hours, more preferably 20 minutes to 3 hours, and particularly preferably 30 minutes to 1 hour.

The positive electrode active material 13a coated with the carbon material obtained through steps 1 to 4 described above (that is, the core part 13c) may be pulverized to have a desired particle diameter, if necessary.

<<Mechanochemical Method>>:

In the mechanochemical method, the surface of the positive electrode active material 13a is coated with the carbon material by using well-known devices such as ACM Pulperizer, Inomizer, impeller mill, turbo mill, hammer mill, fine mill, Zepros, and hybridizers. At this time, the rotation speed (treatment rotation speed) is preferably 1,000 to 20,000 rpm, and more preferably 3,000 to 18,000 rpm. In addition, the load power is preferably 200 to 800 W, and more preferably 400 to 650 W. The treatment time is preferably 1 to 60 minutes, and more preferably 2 to 10 minutes. If such conditions are used, the carbon material can be applied to (carried in) the surface of the positive electrode active material 13a at the above-described preferable coating ratio (support ratio). Further, the carbon material can be uniformly applied to the surface of the positive electrode active material 13a.

<<Shell Part 13s>>:

In this embodiment, the shell part 13s has a configuration in which the second conductive material 13e (here, acetylene black) is included in the base material 13d formed by a predetermined polyethylene glycol-based polyurethane resin as described above. Incidentally, in a case where an electrolyte contained in an electrolyte layer to be described later contains an electrolyte solution (that is, the electrolyte is a liquid electrolyte or a gel electrolyte), an electrolyte solution derived from an electrolyte contained in an electrolyte layer is typically infiltrated in the positive electrode active material layer 13. For this reason, the base material (gel-forming polymer) constituting the shell part 13s absorbs the electrolyte solution to be swollen so that the base material becomes a gel state.

The thickness of the shell part is not particularly limited, but as a thickness of a state in which a gel is not formed, the thickness thereof is preferably 0.01 to 5 μm, and more preferably 0.1 to 2 μm. In addition, as a thickness after the shell part is immersed in an electrolyte solution (1M LiPF$_6$, ethylene carbonate (EC)/diethyl carbonate (DEC)=3/7 (volume ratio)) at 50° C. for 3 days, the thickness thereof is preferably 0.01 to 10 μm, and more preferably 0.1 to 5 μm.

The constitution material of the base material 13d is not limited to the polyethylene glycol-based polyurethane resin, and may be a gel-forming polymer having a tensile elongation at break of 10% or more in a gel state. The term "tensile elongation at break" is an index representing the flexibility of the gel-forming polymer, which is a constitution material of the base material 13d, and is a value obtained by a measurement method described in the section of Examples to be described later. The value of the tensile elongation at break of the gel-forming polymer may be 10% or more, preferably 20% or more, more preferably 30% or more, particularly preferably 40% or more, and most preferably 50% or more. From the viewpoint of solving the problems of the present invention, a larger value of the tensile elongation at break of the gel-forming polymer is preferable.

As a technique of providing flexibility to a gel-forming polymer serving as a constituent material of the base material 13d so as to control the tensile elongation at break to a desired value, a method of introducing a partial structure having flexibility (for example, a long-chain alkyl group, a polyether residue, an alkyl polycarbonate residue, or an alkyl polyester residue) to the main chain of the gel-forming polymer is exemplified. In addition, it is also possible to provide flexibility to a gel-forming polymer so as to adjust the tensile elongation at break by a technique of controlling the molecular weight of the gel-forming polymer or controlling the molecular weight between crosslinks. Particularly, the gel-forming polymer is preferably a polyurethane resin. When the polyurethane resin is used as a gel-forming polymer, which is a constituent material of the base material 13d, first, there is an advantage that a shell part having high flexibility (large tensile elongation at break) is formed. Further, since urethane bonds may form a strong hydrogen bond with each other, it is possible to form a gel-forming polymer having a stable structure while being excellent in flexibility.

When the gel-forming polymer is a polyurethane resin, the specific form thereof is not particularly limited, and reference can be made to the already-known knowledge.

The polyurethane resin is configured by (1) a polyisocyanate component and (2) a polyol component, and may be configured by further using (3) an ionic group-introducing component, (4) an ionic group-neutralizing agent component, and (5) a chain extending agent component, as necessary.

Examples of (1) the polyisocyanate component include diisocyanate compounds having two isocyanate groups in one molecule, and polyisocyanate compounds having three or more isocyanate groups in one molecule, and these may be used alone or in combination of two or more kinds thereof.

Examples of the diisocyanate compounds include aromatic diisocyanates such as 4,4'-diphenylmethane diisocyanate(MDI), 2,4'-diphenylmethane diisocyanate, toluene-2,4-diisocyanate, toluene-2,6-diisocyanate, p-phenylenediisocyanate, xylylene diisocyanate, 1,5-naphthalene diisocyanate, 3,3'-dimethyldiphenyl-4,4'-diisocyanate, dianisidine diisocyanate, and tetramethylxylylene diisocyanate; alicyclic diisocyanates such as 4,4'-dicyclohexylmethane diisocyanate, isophorone diisocyanate, cis-1,4-cyclohexyl diisocyanate, trans-1,4-cyclohexyl diisocyanate, and norbornene diisocyanate; and aliphatic diisocyanates such as 1,6-hexamethylene diisocyanate, 2,2,4 and/or (2,4,4)-trimethylhexamethylene diisocyanate, and lysine diisocyanate.

These diisocyanate compounds may be used in the form of a modified body such as carbodiimide-modified, isocyanurate-modified, or biuret-modified, and also may be used in the form of a block isocyanate blocked with various blocking agents.

Examples of the polyisocyanate compound having three or more isocyanate groups in one molecule include isocyanurate trimers, biuret trimers, and trimethylolpropane adducts of the diisocyanate provided above as examples; and trifunctional or more isocyanate such as triphenylmethane triisocyanate, 1-methylbenzole-2,4,6-triisocyanate, or dimethyl triphenylmethane tetraisocyanate. These isocyanate compounds may be used in the form of a modified body such as carbodiimide-modified, isocyanurate-modified, or biuret-modified, and also may be used in the form of a block isocyanate blocked with various blocking agents.

Examples of (2) the polyol component include diol compounds having two hydroxyl groups in one molecule and polyol compounds having three or more hydroxyl groups in one molecule, and these may be used alone or in combination of two or more kinds thereof.

Examples of the diol compounds and polyol compounds having three or more hydroxyl groups in one molecule include low molecular weight polyols, polyether polyols, polyester polyols, polyester polycarbonate polyols, crystalline or noncrystalline polycarbonate polyols, polybutadiene polyol, and silicone polyol.

Examples of the low molecular weight polyols include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diols such as cyclohexanedimethanol and cyclohexanediol; and trihydric or higher polyols such as trimethylolethane, trimethylolpropane, hexitols, pentitols, glycerol, polyglycerol, pentaerythritol, dipentaerythritol, and tetramethylolpropane.

Examples of the polyether polyols include ethylene oxide adducts such as diethylene glycol, triethylene glycol, tetraethylene glycol, and polyethylene glycol; propylene oxide adducts such as dipropylene glycol, tripropylene glycol, tetrapropylene glycol, and polypropylene glycol; and ethylene oxide and/or propylene oxide adducts of the low molecular weight polyols described above, and polytetramethylene glycol.

The polyester polyols include a polyester polyol obtained by direct esterification and/or transesterification of a polyol such as the low molecular weight polyols provided above as examples with a polycarboxylic acid or its ester-forming derivative such as ester, anhydride, or halide and/or a lactone or a hydroxycarboxylic acid obtained by ring-opening hydrolysis of the lactone in an amount less than the stoichiometric amount of the polyol. Examples of the polycarboxylic acid or its ester-forming derivative include polycarboxylic acids, such as aliphatic dicarboxylic acids such as oxalic acid, malonic acid, succinic acid, glutaric acid, adipic acid, pimeric acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, and dimer acid; aromatic dicarboxylic acids such as phthalic acid, terephthalic acid, isophthalic acid, and naphthalenedicarboxylic acid; alicyclic dicarboxylic acids such as cyclohexanedicarboxylic acid; tricarboxylic acids such as trimellitic acid, trimesic acid, and trimer of castor oil fatty acid; and tetracarboxylic acids such as pyromellitic acid. Examples of the ester-forming derivative include acid anhydrides of these polycarboxylic acids; halides such as chlorides and bromides of the polycarboxylic acids; and lower aliphatic esters such as methyl, ethyl, propyl, isopropyl, butyl, isobutyl, and amyl esters of the polycarboxylic acids. In addition, examples of the lactones include lactones such as γ-caprolactone, δ-caprolactone, ε-caprolactone, dimethyl-ε-caprolactone, δ-valerolactone, γ-valerolactone, and γ-butyrolactone.

Examples of (3) the ionic group-introducing component, which is used as necessary, include substances capable of introducing an anionic group and substances capable of introducing a cationic group. Examples of the substances capable of introducing an anionic group include polyols containing a carboxyl group, such as dimethylolpropionic acid, dimethylolbutanoic acid, dimethylolbutyric acid, and dimethylolvaleric acid, and polyols containing a sulfonic acid group, such as 1,4-butanediol-2-sulfonic acid, and examples of the substances capable of introducing a cationic group include N,N-dialkylalkanolamines, N-alkyl-N,N-dialkanolamines such as N-methyl-N,N-diethanolamine and N-butyl-N,N-diethanolamine, and trialkanolamines.

As (4) the ionic group-neutralizing agent component, which is used as necessary, examples of anionic group neutralizers include tertiary amine compounds such as trialkylamines (such as trimethylamine, triethylamine, and tributylamine), N,N-dialkylalkanolamines (such as N,N-dimethylethanolamine, N,N-dimethyl propanolamine, N,N-dipropylethanolamine, and 1-dimethylamino-2-methyl-2-propanol), N-alkyl-N,N-dialkanolamines, and trialkanolamines (such as triethanolamine); and basic compounds (such as ammonia, trimethylammonium hydroxide, sodium hydroxide, potassium hydroxide, and lithium hydroxide), and examples of cationic group neutralizers include organic carboxylic acids such as formic acid, acetic acid, lactic acid, succinic acid, glutaric acid, and citric acid; organosulfonic acids such as paratoluene sulfonic acid and alkyl sulfonates; inorganic acids such as hydrochloric acid, phosphoric acid, nitric acid, and sulfonic acid; epoxy compounds such as epihalohydrin; and quaternizing agents such as dialkyl sulfates and alkyl halides.

As (5) the chain extending agent component which is used as necessary, one or two or more kinds of commonly known chain extending agents can be used, and polyamine compounds, polyhydric primary alcohol compounds, and the like are preferable, and polyamine compounds are more preferable. Examples of the polyamine compounds include low molecular weight diamines resulting from the substitution of an alcoholic hydroxyl group in the low molecular weight diols provided as examples with an amino group, such as ethylenediamine and propylenediamine; polyetherdiamines such as polyoxypropylenediamine and polyoxyethylenediamine; alicyclic diamines such as menthenediamine, isophoronediamine, norbornenediamine, bis(4-amino-3-methyldicyclohexyl)methane, diaminodicyclohexylmethane, bis(aminomethyl)cyclohexane, and 3,9-bis(3-aminopropyl)2,4,8,10-tetraoxaspiro(5,5)undecane; aromatic diamines such as m-xylenediamine, α-(m/p aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, and α,α'-bis(4-aminophenyl)-p-diisopropylbenzene; hydrazine; and dicarboxylic acid dihydrazide compounds, which are compounds formed of hydrazine and dicarboxylic acids provided as examples of the polycarboxylic acid to be used for the above-described polyester polyols.

Among the respective components described above, as (1) the polyisocyanate component, a diisocyanate compound is preferably used, 4,4'-diphenylmethane diisocyanate (MDI), 2,4'-diphenylmethane diisocyanate, 4,4'-dicyclohexylmethanediisocyanate, 1,4-cyclohexyldiisocyanate, toluene-2,4-diisocyanate, 1,6-hexamethylene diisocyanate, or the like is particularly preferably used, and diphenylmethane-4,4'-diisocyanate (MDI) is most preferably used. In addition, as (2) the polyol component, it is preferable that ethylene oxide adducts, which are diol compounds, be necessarily used, and it is particularly preferable that polyethylene glycol be necessarily used. That is, the polyurethane resin is preferably the one obtained by reaction of polyethylene glycol and an isocyanate compound. Since polyethylene glycol is excellent in lithium ion conductivity, with such a configuration, the effect of lowering (inhibiting an increase in) the internal resistance of the battery may be significantly exhibited. Herein, the number average molecular weight of polyethylene glycol as calculated from a hydroxyl value is not particularly limited, but is preferably 2,500 to 15,000, more preferably 3,000 to 13,000, and further preferably 3,500 to 10,000. From the viewpoint of heat resistance, in addition to the essential components described above, it is preferable to further use ethylene glycol and/or glycerol as a polyol component. In particular, when only ethylene glycol is concurrently used without using glycerol, a gel obtained by swelling of a gel-forming polymer becomes a physically cross-linked gel, and thus a solvent can be dissolved at the time of production. Further, various producing methods as described later can be used. On the other hand, when glycerol is also concurrently used in addition to ethylene glycol, the main chains of a polyurethane resin are chemically cross-linked to each other. In this case, there is an advantage that the swelling degree to an electrolyte solution can be arbitrarily controlled by controlling the molecular weight between crosslinks.

Incidentally, the synthesis method of a polyurethane resin is not particularly limited, and reference can be made to the already-known knowledge.

In the above description, as a preferred embodiment of the invention according to this embodiment, a case where the gel-forming polymer is a polyurethane resin has been described in detail, but it is needless to say that the configuration of the gel-forming polymer is not limited thereto. For example, a copolymer of polyvinylidene fluoride and hexafluoropropylene (PVdF-HFP), polyacrylonitrile (PAN), (meth)acrylic resin or the like is used as a gel-forming polymer, similarly. Further, even in a case where these resins are used, it is possible to adjust a tensile elongation at break by providing flexibility to a polymer by using a technique of controlling the molecular weight of the gel-forming polymer, designing a molecular structure, or the like as described above.

In the shell part 13s, the specific type or the containing form of the second conductive material 13e in the base material is not particularly limited, but it is sufficient that a conductive path between the core part 13c and the surface of the electrode material (the outer surface of the shell part 13s) can be formed. Further, the first conductive material 13b and the second conductive material 13e may be formed by using the same material, but they are clearly distinguished in the core-shell-type positive electrode material 13A. That is, a material with which the surface of the positive electrode active material 13a is directly coated is the first conductive material 13b, and a material which is dispersed in the shell part 13s is the second conductive material 13e. In addition, these materials are also clearly distinguished in the production process as described below. In this embodiment, by coating the surface of the positive electrode active material 13a with the first conductive material 13b, the core part 13c is produced in advance, and then the shell part 13s containing the second conductive material 13e is formed on the surface of the core part 13c. In this way, the first conductive material 13b and the second conductive material 13e are distinguished from each other in view of addition timing in the production step of the core-shell-type positive electrode material 13A.

Examples of the type of the second conductive material 13e includes carbon black such as Ketjen black or acetylene black; carbon materials such as graphite and carbon fiber (for example, vapor-phase growth carbon fiber (VGCF)); various kinds of carbon nanotube (CNT), and other conductive fibers. As for the containing form of the conductive material 13e, in a case where the second conductive material 13e is acetylene black or a material which may have a filamentous structure such as carbon fiber, as illustrated in FIG. 2, it is preferable that the surface of the electrode active material 13a (the positive electrode active material in FIG. 2) or the first conductive material 13b constituting the core part 13c and the surface of the electrode material (the outer surface of the shell part 13s) be electrically conducted via the second conductive material 13e.

The ratio of the content of the base material 13d and the second conductive material 13e contained in the shell part 13s is also not particularly limited, but, for example, the content of the second conductive material is preferably 10 to 400 parts by mass, and more preferably 25 to 150 parts by mass relative to 100 parts by mass of the base material.

When the content of the conductive material is 10 parts by mass or more, it is possible to form a sufficient conductive path, which contributes to a decrease (suppressing an increase) in the internal resistance of the battery. On the other hand, when the content of the conductive material is 400 parts by mass or less, from the viewpoints of having stability of the shell layer, the above content is preferable. Incidentally, a value of the ratio of those contents thereof is calculated as an average value of values obtained by measuring 50 or more of core-shell-type electrode active materials.

As described above, according to the non-aqueous electrolyte secondary battery related to this embodiment, the effect of lowering (suppressing an increase in) the internal resistance of the battery is obtained, because the surface of the core part 13c is coated with the shell part 13s. The invention according to the embodiment can be carried out by referring to the disclosure regarding the inventions of the electrode material according the aforementioned embodiment.

<<Method for Producing Core-Shell-Type Electrode Material>>:

The method for producing a core-shell-type electrode material is not particularly limited, but any techniques may be preferably used as long as the method includes a coating step of coating a core part in which at least a part of a surface of an electrode active material is coated with a first conductive material with a shell part in which a second conductive material is included in a base material formed by a gel-forming polymer having a tensile elongation at break of 10% or more in a gel state. For example, the following three techniques are exemplified.

(1) Poor Solvent Precipitation Method (Referring to Section of Examples to be described Later). In this method, first, a gel-forming polymer as a base material constituting the shell part 13s is dissolved in a good solvent (in a case where the gel-forming polymer is the polyurethane resin described above, for example, N,N-dimethylformamide (DMF)). Next, powder of an electrode active material coated with the first conductive material is dispersed in the solution, and a poor solvent of the gel-forming polymer (in a case where the gel-forming polymer is the polyurethane resin described above, for example, isopropanol (IPA)) is added to the solution. In this method, the gel-forming polymer is precipitated on the surface of the electrode active material and on the surface of the first conductive material based on the amount of the poor solvent added and the coating of the core part with the gel-forming polymer is achieved. As necessary, the addition of the poor solvent may be separately performed in plural times, or the poor solvent can also be contained in the original solution. At this time, when the second conductive material is dispersed in a poor solvent to be added at any time of addition of the poor solvent, the second conductive material can be contained in advance in the gel-forming polymer to be precipitated, and thus a core-shell-type electrode material as illustrated in FIG. 2 can be obtained. Incidentally, the above-described operation may be repeated in such a manner that the solid content is filtered by a technique such as filtration under reduced pressure after a predetermined amount of the shell part is formed, and then the filtered solid content is dissolved in the above-described good solvent. At this time, the distribution of the conductive material in the shell part 13s can also be controlled to have a desired form by differentiating the amount (concentration) of the second conductive material to be contained in the gel-forming polymer to be precipitated.

(2) Sugar Coating Method (Simple Spray Drying Method). In this method, first, a solution is prepared by dissolving the second conductive material and a gel-forming polymer in a good solvent of the gel-forming polymer. Next, the obtained solution is sprayed on the surface of an electrode active material coated with the first conductive material, and then, as necessary, drying treatment is carried out under stirring. Thus, it is possible to obtain a core-shell-type electrode material as illustrated in FIG. 2 by means of the simple technique.

(3) Solid Grinding Method. In this method, a solution is prepared by dissolving an electrode active material coated with the first conductive material, the second conductive material, and a gel-forming polymer in a good solvent of the gel-forming polymer. Next, this solution is spread on, for example, a tray, and is dried at a temperature of about 60 to 100° C. so as to evaporate the solvent. In this way, the obtained solid matter is ground to have a desired particle diameter, and, as necessary, screening is carried out. Even in such a technique, it is possible to obtain a core-shell-type electrode material as illustrated in FIG. 2 by means of the simple technique.

Among the above (1) to (3), from the viewpoint of the completeness of coating, the method of (1) described above is preferable. In addition, from the viewpoint of ease of the process, the methods of (2) and (3) described above, which further include a step of preparing a mixture containing the base material (gel-forming polymer) and the conductive material in advance before the coating step of the electrode active material, are preferable.

Hereinbefore, the specific embodiment of the core-shell-type positive electrode material contained in the positive electrode active material layer 13, which is the characteristic configuration in this embodiment, has been described, but the positive electrode active material layer 13 may contain a positive electrode active material other than the aforementioned core-shell-type positive electrode material (for example, the same material as in the related art). Further, in addition to the positive electrode active material (including the core-shell-type positive electrode material), the positive electrode active material layer 13 may contain a binder, a conductive aid, an ion conductive polymer, a lithium salt, or the like.

Examples of the binder include a solvent-based binder such as polyvinylidene fluoride (PVdF), and an aqueous binder.

The electrode active material layer preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced. In addition, when an aqueous binder is used as a binder to be contained in the active material layer in the present invention, water is used as a solvent for preparing an active material slurry which is prepared at the time of coating of the active material layer. However, in this case, even when a core-shell-type electrode material is further added to the active material slurry, the risk that a gel-forming material constituting the electrode material is dissolved in water serving as a preparation solvent is small. For this reason, there are also advantages that it is possible to stably use the electrode material and a gel-forming polymer, which may form a physically cross-linked gel can be used in production of the electrode material.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acryl copolymer, or the like), acrylonitrile-butadiene rubber, methyl methacrylate-butadiene rubber, a (meth)acrylic polymer (polyethylacrylate, polyethylmethacrylate, polypropylacrylate, polymethylmethacrylate (methyl methacrylate rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is preferably 200 to 4000, and more preferably 1000 to 3000, and the saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and salts thereof), polyvinylpyrrolidone, polyacrylic acid (salt), a copolymer of (meth)acrylamide and/or (meth)acrylic acid salt [a (meth)acrylamide polymer, a (meth)acrylamide-(meth)acrylic acid salt copolymer, an alkyl (carbon atom number of 1 to 4) (meth)acrylate-(meth)acrylic acid salt copolymer, or the like], a styrene-maleic acid salt copolymer, a mannich modified product of polyacrylamide, a formalin condensation type resin (a urea-formalin resin, a melamin-formalin resin, or the like), a polyamidepolyamine or dialkylamine-epichlorohydrin copolymer, polyethyleneimine, casein, soybean protein, synthetic protein, and a water soluble polymer such as galactomannan derivatives. These aqueous binders may be used alone or in combination of two or more kinds thereof.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Moreover, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and salts thereof), polyvinylpyrrolidone, polyacrylic acid (salt), and polyethylene glycol. Among them, styrene-butadiene rubber and carboxymethyl cellulose (salt) are preferably combined as a binder. The weight content ratio of the styrene-butadiene rubber to the water soluble polymer is not particularly limited, but the styrene-butadiene rubber: the water soluble polymer is preferably 1:0.1 to 10, and more preferably 1:0.5 to 2.

The conductive aid means an additive which is blended in order to enhance the conductivity of the electrode active material layer. Examples of the conductive aid include carbon materials such as carbon black including Ketjen black, acetylene black, and the like, graphite, and carbon fiber, which are similar to the above-mentioned second conductive material. When the active material layer contains a conductive aid, an electron network in the inside of the active material layer is effectively formed, and it can contribute to improvement of the output characteristics of a battery.

Examples of the ion conductive polymer include polyethylene oxide (PEO)-based and polypropylene oxide (PPO)-based polymers.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

A blending ratio of the components that are contained in the positive electrode active material layer 13 and the negative electrode active material layer 15 to be described later is not particularly limited. The blending ratio can be adjusted by suitably referring to the already-known knowledge about a lithium ion secondary battery. Also, the thickness of each active material layer is not particularly limited, and reference can be made to the already-known knowledge about a battery. For example, the thickness of each active material layer is about 2 to 100 μm.

<<Negative Electrode Active Material Layer>>:

The negative electrode active material layer 15 contains a negative electrode active material. Further, the negative electrode active material layer 15 may contain a binder, a conductive aid, an ion conductive polymer, a lithium salt, or the like in addition to the negative electrode active material. Since the details of the negative electrode active material layer are basically the same as the details described in the section of "Positive Electrode Active Material Layer" except the type of the negative electrode active material, description thereof will be omitted. In other words, in the descriptions referring to FIG. 1 and FIG. 2, a case where the positive electrode active material layer 13 contains a core-shell-type electrode material (positive electrode material) has been described as an example, but the present invention can also be applied to the negative electrode. That is, the negative electrode active material contained in the negative electrode active material layer 15 may be a core-shell-type electrode material (negative electrode material) according to the present invention.

Examples of the negative electrode active material include a carbon material such as graphite (black lead), soft carbon, or hard carbon, a lithium-transition metal composite oxide (for example, $Li_4Ti_5O_{12}$), a metal material, and a lithium alloy-based negative electrode material. In some cases, two or more kinds of a negative electrode active material may be concurrently used. Preferably, from the viewpoint of capacity and output characteristics, a carbon material or a lithium-transition metal composite oxide is used as a negative electrode active material. Incidentally, it is needless to say that a negative electrode active material other than those described above may also be used.

Further, a base material (gel-forming polymer) constituting the shell part in the core-shell-type electrode material according to the present invention has a property of easily adhering to particularly a carbon material. For this reason, in a case where the core-shell-type electrode material of the present invention is applied to a negative electrode, from the viewpoint of providing an electrode material with a stable structure, it is preferable in the present invention to use a carbon material as a negative electrode active material. With such a configuration, the base material (gel-forming polymer) easily adheres to the surface of the negative electrode active material which is not coated with the first conductive material, and thus an electrode material with a more stable structure is provided.

The average particle diameter of the negative electrode active material (in the case of a core-shell-type electrode material, the average particle diameter of a portion of the core part excluding the first conductive material) is not particularly limited, but from the viewpoint of higher output power, is preferably 1 to 100 μm, and more preferably 1 to 20 μm.

<<Electrolyte Layer>>:

The electrolyte to be used in the electrolyte layer 17 of this embodiment is not particularly limited, and a liquid electrolyte, a gel polymer electrolyte, or an ionic liquid electrolyte is used without limitation.

The liquid electrolyte has a function as a lithium ion carrier. The liquid electrolyte constituting an electrolyte solution layer has the form in which lithium salt is dissolved in an organic solvent. Examples of the organic solvent which can be used include carbonates such as ethylene carbonate (EC), propylene carbonate (PC), dimethyl carbonate (DMC), diethyl carbonate (DEC), and ethylmethyl carbonate. Further, as a lithium salt, a compound which can be added to an active material layer of an electrode such as $Li(C_2F_5SO_2)_2N$, $LiPF_6$, $LiBF_4$, $LiClO_4$, $LiAsF_6$, or $LiCF_3SO_3$ can be similarly employed. The liquid electrolyte may further contain an additive in addition to the components described above. Specific examples of such a compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. These cyclic carbonate esters may be used alone or in combination of two or more kinds thereof.

The gel polymer electrolyte has a configuration in which the aforementioned liquid electrolyte is injected to a matrix polymer (host polymer) consisting of an ion conductive polymer. Using the gel polymer electrolyte as an electrolyte is excellent in that the fluidity of an electrolyte disappears and ion conductivity between layers is easily blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA), and copolymers thereof.

The matrix polymer of a gel polymer electrolyte can exhibit excellent mechanical strength by forming a cross-linked structure. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

The ionic liquid electrolyte is obtained by dissolving a lithium salt in an ionic liquid. Incidentally, the ionic liquid is a salt composed of cation and anion alone, and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), $(FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion ($(CF_3SO_2)_2N^-$), bis(pentafluoroethylsulfonyl)imide ion ($(C_2F_5SO_2)_2N^-$), $BF_3C_2F_5^-$, tris(trifluoromethanesulfonyl) carbon acid ion ($(CF_3SO_2)_3C^-$), perchlorate ion ($ClO_4^-$), dicyanamide ion ($(CN)_2N^-$), organic sulfuric acid ion, organic sulfonic acid ion, $R^1COO^-$, $HOOCR^1COO^-$, $^-OOCR^1COO^-$, and $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom).

Preferred examples of the ionic liquid include 1-methyl-3-methylimidazolium bis(trifluoromethanesulfonyl)imide, and N-methyl-N-propylpyrrolidinium bis(trifluoromethanesulfonyl)imide. These ionic liquids may be used alone or in combination of two or more kinds thereof.

The lithium salt which is used in the ionic liquid electrolyte is the same lithium salt which is used in the liquid electrolyte described above. Incidentally, the concentration of the lithium salt is preferably 0.1 to 2.0 M, and more preferably 0.8 to 1.2 M.

An additive as described below may be added to the ionic liquid. When an additive is contained, charge/discharge characteristics and cycle characteristics may be further improved at a high rate. Specific examples of the additive include vinylene carbonate, ethylene carbonate, propylene carbonate, γ-butyrolactone, γ-valerolactone, methyl diglyme, sulfolane, trimethylphosphate, triethylphosphate, methoxymethyl ethyl carbonate, and fluorinated ethylene carbonate. These may be used alone or in combination of two or more kinds thereof. The use amount when an additive is used is preferably 0.5 to 10% by mass, and more preferably 0.5 to 5% by mass with respect to the ionic liquid.

In the bipolar type secondary battery of this embodiment, a separator may be used in an electrolyte layer. The separator has a function of holding an electrolyte so as to secure the lithium ion conductivity between a positive electrode and a negative electrode and a function of serving as a partition wall between a positive electrode and a negative electrode. In particular, in a case where a liquid electrolyte or an ionic liquid electrolyte is used as an electrolyte, it is preferable to use a separator.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a single layer or a multilayer. The fine pore diameter of the microporous (microporous membrane) separator is preferably 1 μm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Further, the bulk density of the non-woven separator is not particularly limited as long as sufficient battery characteristics are obtained with an impregnated polymer gel electrolyte. Furthermore, it is sufficient that the thickness of the non-woven separator is the same as that of an electrolyte layer, and the thickness thereof is preferably 5 to 200 μm, and particularly preferably 10 to 100 μm.

Further, as a separator, a separator in which a heat resistant insulating layer is laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, a melting point or a heat softening point of 150° C. or higher, preferably 200° C. or higher, are used. By having a heat resistant insulating layer, internal stress in a separator, which increases under temperature increase, is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Moreover, because of the effect of inhibiting thermal shrinkage and a high level of mechanical strength, the separator is hardly curled during the process of producing a battery.

The inorganic particles in a heat resistant insulating layer contribute to the mechanical strength or the effect of inhibiting thermal shrinkage of the heat resistant insulating layer. The material used as inorganic particles is not particularly limited. Examples thereof include oxides ($SiO_2$, $Al_2O_3$, $ZrO_2$, $TiO_2$), hydroxides, and nitrides of silicon, aluminum, zirconium, and titanium, and a composite thereof. These inorganic particles may be derived from mineral resources such as boehmite, zeolite, apatite, kaolin, mullite, spinel, olivine, and mica, or artificially synthesized. Furthermore, these inorganic particles may be used alone or in combination of two or more kinds thereof. Among them, from the viewpoint of the cost, it is preferable to use silica ($SiO_2$) or alumina ($Al_2O_3$), and it is more preferable to use alumina ($Al_2O_3$).

The weight per unit area of heat resistant particles is not particularly limited, but is preferably 5 to 15 g/m². When the weight per unit area is within this range, sufficient ion conductivity is obtained and heat resistant strength is maintained, which is preferable.

The binder in a heat resistant insulating layer has a role of attaching inorganic particles to each other or attaching inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used as the binder include compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among these, carboxymethyl cellulose (CMC), methyl acrylate, or polyvinylidene fluoride (PVDF) is preferably used. These compounds may be used alone or in combination of two or more kinds thereof.

The content of the binder in the heat resistant insulating layer is preferably 2 to 20% by weight with respect to 100% by weight of the heat resistant insulating layer. When the content of the binder is 2% by weight or more, the peeling strength between the heat resistant insulating layer and a porous substrate layer can be increased and vibration resistance of a separator can be enhanced. On the other hand, when the content of the binder is 20% by weight or less, a gap between inorganic particles is maintained at an appropriate level so that sufficient lithium ion conductivity can be ensured.

The thermal shrinkage rates of a separator having a heat resistant insulating layer for both MD and TD are 10% or less after maintaining for 1 hour at conditions of 150° C. and 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

<<Positive Electrode Current Collecting Plate and Negative Electrode Current Collecting Plate>>:

The material for forming a current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable. Aluminum is particularly preferable. Incidentally, the same material or a different material may be used for the positive electrode current collecting plate 25 and negative electrode current collecting plate 27.

<<Positive Electrode Lead and Negative Electrode Lead>>:

Further, although it is not illustrated, the current collector 11 and the current collecting plate (25, 27) may be electrically connected to each other via a positive electrode lead or a negative electrode lead. The same material used for a lithium ion secondary battery of a related art can be also used as a material for forming the positive and negative electrode leads. Incidentally, a portion led from an outer casing is preferably coated with a heat resistant and insulating thermally shrunken tube or the like so that it has no influence on a product (for example, an automobile component, in particular, an electronic device or the like) according to electric leak after contact with peripheral devices or wirings.

<<Sealing Portion>>:

The sealing portion (insulation layer) has a function of preventing contact between the current collectors adjacent to each other and preventing a short circuit caused at the end portion of the single battery layer. The material constituting the sealing portion may be any materials as long as it has an insulation property, a sealing property (sealing performance) to prevent the solid electrolyte from coming off and prevent permeation of external moisture, heat resistance under battery operation temperature and the like. Examples of the material include an acrylic resin, a urethane resin, an epoxy resin, a polyethylene resin, a polypropylene resin, a polyimide resin, and rubber (ethylene-propylene-diene rubber: EPDM). Alternatively, an isocyanate adhesive, an acrylic resin adhesive, a cyanoacrylate adhesive, or the like may be used, and a hot-melt adhesive (urethane resin, polyamide resin, polyolefin resin) may also be used. Among these, from the viewpoint of corrosion resistance, chemical resistance, ease of production (film-forming performance), economical efficiency, and the like, a polyethylene resin or a polypropylene resin is preferably used as a constituent material of the insulation layer, and a resin containing an amorphous polypropylene resin as a main component and obtained by copolymerizing ethylene, propylene, and butene is preferably used.

<<Battery Outer Casing Body>>:

As a battery outer casing body, an envelope-shaped casing capable of covering a power generating element as illustrated in FIG. 1, in which a laminate film 29 including aluminum is contained, may be used in addition to a known metal can casing. As for the laminate film, a laminate film with a three-layered structure formed by laminating PP, aluminum, and nylon in this order can be used, but is not limited thereto. From the viewpoint of having higher output power and excellent cooling performance, and of being suitably usable for a battery for a large instrument such as an EV or an HEV, a laminate film is desirable. In addition, since the group pressure applied from outside to a power generating element can be easily controlled and thus the thickness of an electrolyte solution layer can be easily controlled to a desired value, an aluminate laminate is more preferred for an outer casing body.

In the bipolar type secondary battery of this embodiment, when a positive electrode active material layer or a negative electrode active material layer is configured by using the above-described sheet-shaped electrode, the stress caused by expansion and shrinkage of an active material is alleviated even when an active material having a large battery capacity is used, and thus the cycle characteristics of the battery can be improved. Therefore, the bipolar type secondary battery of this embodiment is suitably used as a power source for operating an EV or an HEV.

Figure 3:
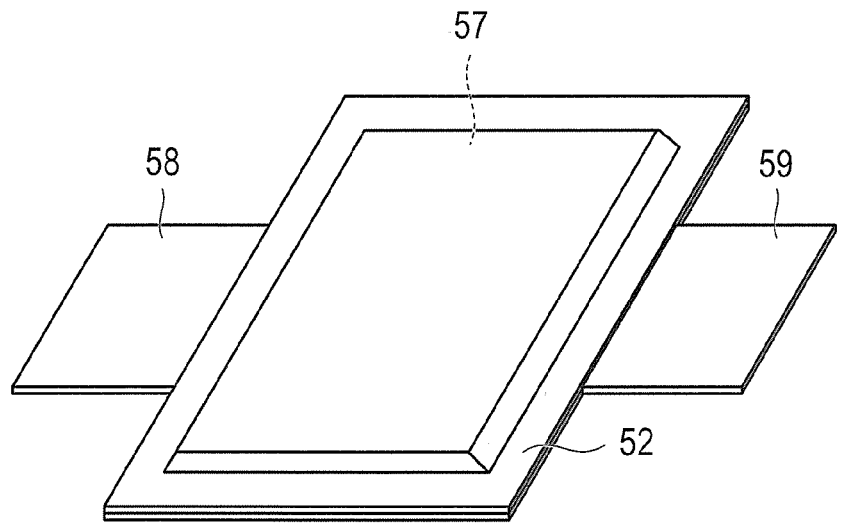
FIG. 3 is a perspective view illustrating the appearance of a flat lithium ion secondary battery as a representative embodiment of a secondary battery.

<<Cell Size>>:

FIG. 3 is a perspective view illustrating the appearance of a flat lithium ion secondary battery as a representative embodiment of a secondary battery.

As illustrated in FIG. 3, a flat lithium ion secondary battery 50 has a flat and rectangular shape, and from both sides, a positive electrode tab 58 and a negative electrode tab 59 are drawn to extract electric power. A power generating element 57 is covered by a battery outer casing material (laminate film 52) of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the bipolar type secondary battery 10 illustrated in FIG. 2 as described above. In the power generating element 57, plural single battery layers (single cell) 19, which are each formed of the positive electrode (positive electrode active material layer) 15, the electrolyte layer 17, and the negative electrode (negative electrode active material layer) 13, are laminated.

Incidentally, the lithium ion secondary battery is not limited to a flat shape of laminate type. The winding type lithium ion secondary battery may have a barrel shape or a flat and rectangular shape obtained by modifying the barrel shape, and there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such shape.

Further, drawing of the tabs 58 and 59 illustrated in FIG. 3 is also not particularly limited. The positive electrode tab 58 and the negative electrode tab 59 may be drawn from the same side or each of the positive electrode tab 58 and the negative electrode tab 59 may be divided into plural tabs and drawn from each side, thus there is no particular limitation on the embodiment illustrated in FIG. 3. In addition, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charge and discharge are stored in this space, storage space efficiency of a cell is generally about 50%. The cell loading efficiency for this space is a factor of determining the cruising distance of an electric vehicle. As the size of a single cell decreases, the loading efficiency is lowered, and thus it becomes impossible to maintain the cruising distance.

Therefore, in the present invention, the battery structure of which power generating element is covered with an outer casing body preferably has a large size. Specifically, the length of the short side of a laminate cell battery is preferably 100 mm or more. Such a large-sized battery can be used for an automobile. Herein, the length of the short side of the laminate cell battery indicates the length of the shortest side. The upper limit of the length of the short side is not particularly limited, but is generally 400 mm or less.

<<Volume Energy Density and Rated Discharge Capacity>>:

According to the market requirement, a typical electric vehicle needs to have driving distance (cruising distance) of 100 km per single charge. Considering such a cruising distance, the volume energy density of a battery is preferably 157 Wh/L or more, and the rated capacity is preferably 20 Wh or more.

Further, it is also possible to define the large size of a battery in view of a relation of battery area or battery capacity, from the viewpoint of a large-sized battery, which is different from a physical size of an electrode. For example, in the case of a flat and stack type laminate battery, the problem of having lowered battery characteristics (cycle characteristics), which is caused by the collapse of the crystal structure and the like accompanying expansion and shrinkage of an active material, may occur more easily in a battery having a value of a ratio of the battery area (projected area of a battery including a battery outer casing body) to the rated capacity is 5 $cm^2$/Ah or more and having a rated capacity of 3 Ah or more since the battery area per unit capacity is large. Therefore, the non-aqueous electrolyte secondary battery according to this embodiment is preferably a large-sized battery as described above from the viewpoint of having a larger merit obtained from exhibition of the working effects of the present invention. Furthermore, an aspect ratio of a rectangular electrode is preferably 1 to 3, and more preferably 1 to 2. Incidentally, the aspect ratio of the electrode is defined by the longitudinal/transversal ratio of a positive electrode active material layer with a rectangular shape. When the aspect ratio is set to be in such a range, an advantage of having both performances required for a vehicle and loading space can be obtained.

<<Assembled Battery>>:

An assembled battery is formed by connecting plural batteries. Specifically, at least two of them are used in series, in parallel, or in series and parallel. According to arrangement in series or parallel, it is possible to freely adjust the capacity and voltage.

It is also possible to form a detachable small-size assembled battery by connecting plural batteries in series or in parallel. Further, by connecting again plural detachable small-size assembled batteries in series or parallel, an assembled battery having high capacity and high output, which is suitable for a power source or an auxiliary power source for operating a vehicle requiring a high volume energy density and a high volume output density, can be formed. The number of the connected batteries for producing an assembled battery or the number of the stacks of a small-size assembled battery for producing an assembled battery with high capacity may be determined depending on the capacity or output of a battery of a vehicle (electric vehicle) on which the battery is mounted.

<<Vehicle>>:

The non-aqueous electrolyte secondary battery of the present invention can maintain discharge capacity even when it is used for a long period of time, and thus has good cycle characteristics. Further, the non-aqueous electrolyte secondary battery has a high volume energy density. For use in a vehicle such as an electric vehicle, a hybrid electric vehicle, a fuel cell electric vehicle, or a hybrid fuel cell electric vehicle, a long service life is required as well as high capacity and large size compared to use for an electric and mobile electronic device. Therefore, the non-aqueous electrolyte secondary battery described above can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability and output characteristics, and a long service life can be formed, and thus, by mounting this battery, a plug-in hybrid electric vehicle with a long EV driving distance and an electric vehicle with a long driving distance per charge can be achieved. This is because, when the battery or an assembled battery formed by combining plural batteries is used for, for example, a vehicle such as a hybrid car, a fuel cell electric car, and an electric car (including a two-wheel vehicle (motor bike) or a three-wheel vehicle in addition to all four-wheel vehicles (an automobile, a truck, a commercial vehicle such as a bus, a compact car, or the like)), a vehicle with a long service life and high reliability can be provided. However, the use is not limited to a vehicle, and it can be applied to various power sources of other transportation means, for example, a moving object such as an electric train, and it can be also used as a power source for loading such as an uninterruptable power source device.

Hereinafter, the description is made below in more detail by means of Examples and Comparative Examples, but the present invention is not limited only to the Examples described below.

Production Example 1

Synthesis of Gel-Forming Polymer (Polyethylene Glycol-Based Polyurethane Resin). To a four-necked flask equipped with a stirrer and a thermometer, 57.4 parts by mass of polyethylene glycol having a number average molecular weight (as calculated from an OH value) of 6,000, 8.0 parts by mass of ethylene glycol, 34.7 parts by mass of diphenylmethane-4,4'-diisocyanate (MDI), and 233 parts by mass of N,N-dimethylformamide (DMF) were introduced and reacted at 70° C. for 10 hours under a dried nitrogen atmosphere, thereby obtaining a polyurethane resin solution having a resin concentration of 30% by mass and a viscosity of 600 poise (60 Pa·s, 20° C.).

The polyurethane resin solution obtained in this way was cast on a PET film and then dried to form a sheet-shaped film having a thickness of 500 μm, and then the sheet-shaped film was punched in a dumbbell form. Then, after the film was immersed in an electrolyte solution (1M $LiPF_6$, ethylene carbonate (EC)/diethyl carbonate (DEC)=3/7 (volume ratio)) at 50° C. for 3 days, a value of the tensile elongation at break was measured in accordance with ASTM D683 (test piece shape Type II), and as a result, was 50%.

Production Example 2

Carbon Coating of $LiCoO_2$ Particle (Sintering Method). Into a beaker, 50 g of distilled water was put and heated to 90° C., and 1.0 g of polyvinyl alcohol as a water-soluble polymer was added thereto and was dissolved under stirring. After 10.0 g of $LiCoO_2$ powder as an active material was added to a water-soluble polymer aqueous solution thus prepared so as to disperse the active material, moisture was evaporated by heating and stirring. After the obtained solid was further dried at 120° C., the dried solid was put into an electric furnace at 400° C. so as to be heated for 30 minutes, and then was taken out of the furnace and allowed to cool. It was confirmed by the SEM observation that the surface of $LiCoO_2$ particle was carbon-coated.

Coating of Active Material with Gel-Forming Polymer (Polyethylene Glycol-Based Polyurethane Resin) Containing Acetylene Black (Poor Solvent Precipitation Method). To a 1 L Erlenmeyer flask, 1.36 parts by mass of the polyurethane resin solution obtained in Production Example 1 described above (diluted with DMF to be 19.7% by mass of the resin content), 50 parts by mass of DMF, and 50 parts by mass of isopropanol (IPA) were introduced and uniformly stirred. Then, 15 parts by mass of the active material produced by the above-described method (carbon-coated $LiCoO_2$ particle) was added thereto, and the resultant mixture was further stirred for 5 minutes. 100 parts by mass of IPA was further added dropwise thereto with a dropping funnel.

After completion of dropping, a solution obtained by dispersing 0.27 part by mass of acetylene black as a conductive material in 40 parts by mass of IPA was added, and the resultant mixture was stirred for 10 minutes. This dispersion liquid was subjected to filtration under reduced pressure, and thus powder was filtered.

Figure 4:
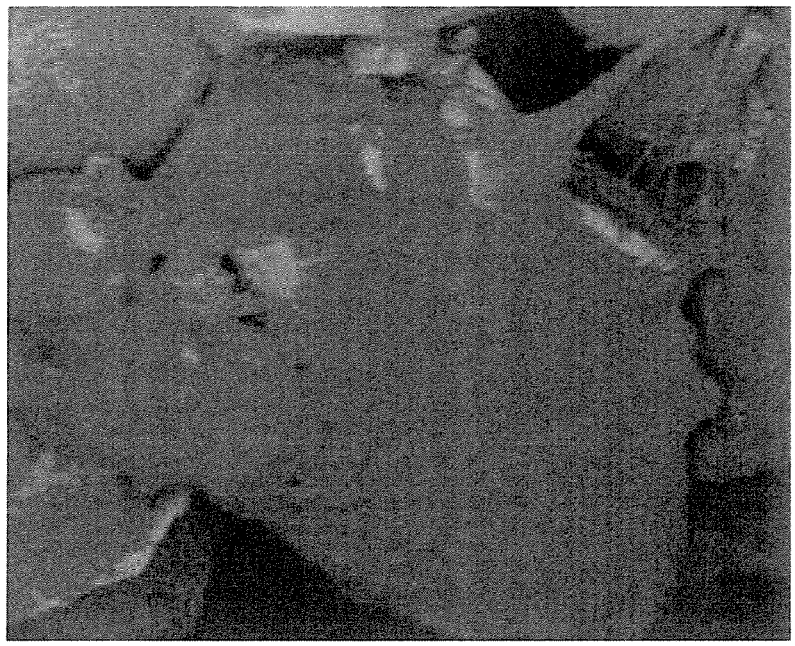
FIG. 4 is a scanning electron microscope (SEM) photograph (magnification of 5000) of a core-shell-type electrode material (positive electrode material) obtained in Production Example 2 to be described later.

The aforementioned operation from the operation in which 50 parts by mass of DMF and 50 parts by mass of IPA were introduced to the filtered powder was repeated three times in total, thereby obtaining a core-shell-type electrode material (positive electrode material) A1 having a core part formed by carbon-coated $LiCoO_2$ particle and a shell part formed by a gel-forming polymer (polyethylene glycol-based polyurethane resin) containing acetylene black. A scanning electron microscope (SEM) photograph (magnification of 5000) of the core-shell-type electrode material (positive electrode material) A1 obtained in this way is shown in FIG. 4.

Production Example 3

Carbon Coating of $LiFePO_4$ Particle (Sintering Method). An active material coated with a carbon-based material was prepared in the same manner as in Production Example 2 described above, except that $LiCoO_2$ of Production Example 2 described above was changed to $LiFePO_4$. It was confirmed by the SEM observation that the surface of $LiFePO_4$ particle was carbon-coated.

Figure 5:
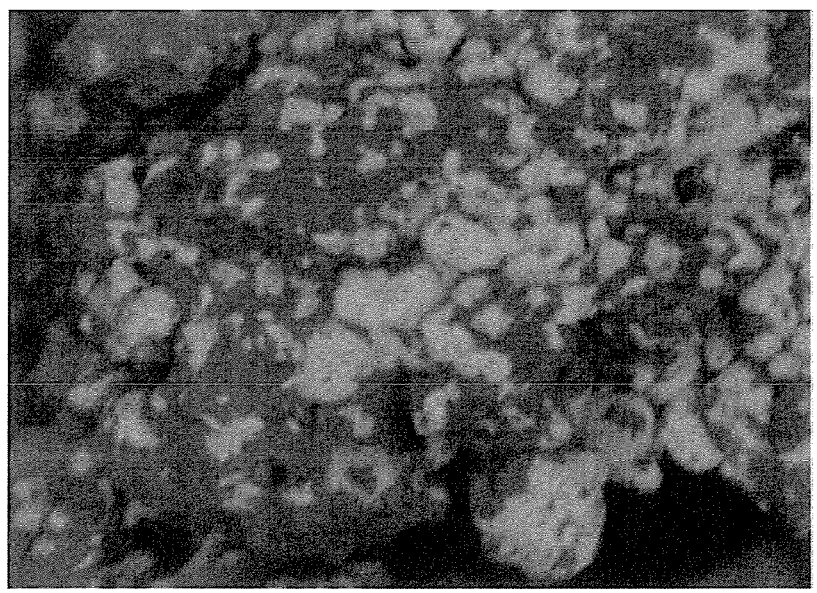
FIG. 5 is a scanning electron microscope (SEM) photograph (magnification of 5000) of a core-shell-type electrode material (positive electrode material) obtained in Production Example 3 to be described later.

Coating of Active Material with Gel-Forming Polymer Containing Acetylene Black (Poor Solvent Precipitation Method). A core-shell-type electrode material A2 was prepared in the same manner as in Production Example 2 described above, except that the active material of Production Example 2 described above (carbon-coated $LiCoO_2$ particle) was changed to the active material prepared by the above-described method (carbon-coated $LiFePO_4$ particle). The scanning electron microscope (SEM) photograph (magnification of 5000) of the obtained core-shell-type electrode material (positive electrode material) A2 is shown in FIG. 5.

Production Example 4

Carbon Coating of $Li_4Ti_5O_{12}$ Particle (Sintering Method). An active material coated with a carbon-based material was prepared in the same manner as in Production Example 2 described above, except that $LiCoO_2$ of Production Example 2 described above was changed to $Li_4Ti_5O_{12}$. It was confirmed by the SEM observation that the surface of $Li_4Ti_5O_{12}$ particle was carbon-coated.

Figure 6:
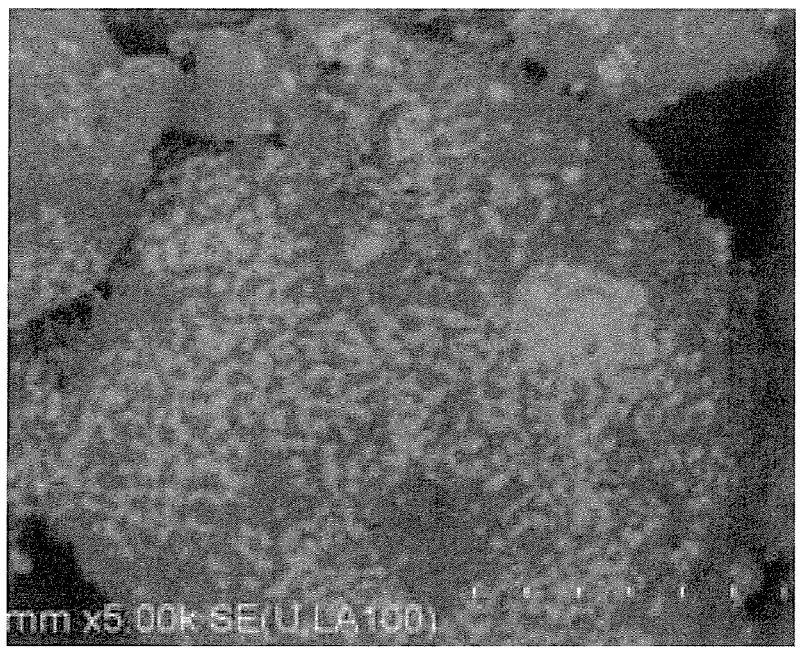
FIG. 6 is a scanning electron microscope (SEM) photograph (magnification of 5000) of a core-shell-type electrode material (positive electrode material) obtained in Production Example 4 to be described later.

Coating of Active Material with Gel-Forming Polymer Containing Acetylene Black (Poor Solvent Precipitation Method). A core-shell-type electrode material A3 was prepared in the same manner as in Production Example 2 described above, except that the active material of Production Example 2 described above (carbon-coated $LiCoO_2$ particle) was changed to the active material prepared by the above-described method (carbon-coated $Li_4Ti_5O_{12}$ particle). The scanning electron microscope (SEM) photograph (magnification of 5000) of the obtained core-shell-type electrode material (positive electrode material) A3 is shown in FIG. 6.

Production Example 5

Carbon Coating of $LiCoO_2$ Particle (Mechanochemical Method). To 92.6 g of $LiCoO_2$, 2.4 g of acetylene black (AB) was added and then treated by a hybridizer so that AB was attached to the surface of $LiCoO_2$ and the active material was coated. At this time, the treatment was continuously carried out for 3 minutes under the treatment conditions of a rotation speed of 15,000 rpm and a load power of 600 W, using a hybridization system manufactured by NARA MACHINERY CO., LTD. It was confirmed by the SEM observation that the surface of $LiCoO_2$ particle was carbon-coated.

Figure 7:
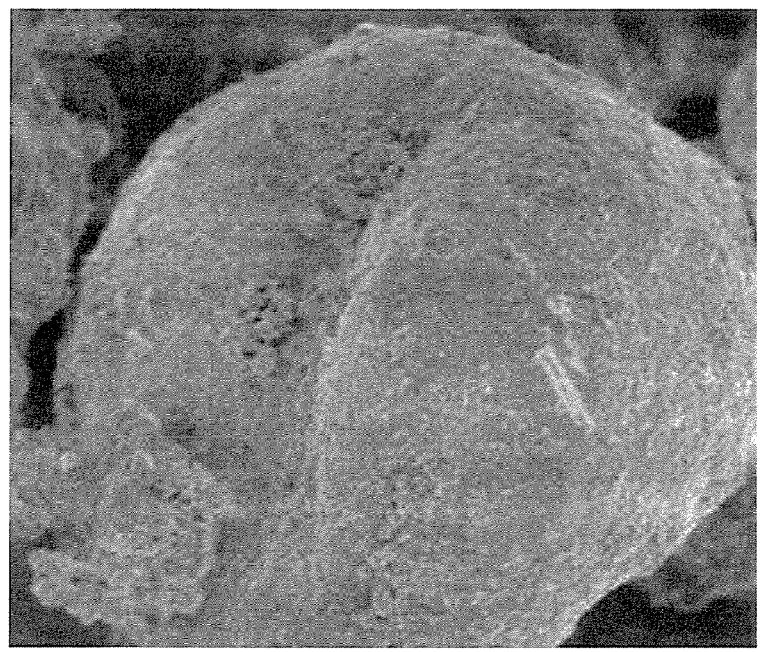
FIG. 7 is a scanning electron microscope (SEM) photograph (magnification of 5000) of a core-shell-type electrode material (positive electrode material) obtained in Production Example 5 to be described later.

Coating of Active Material with Gel-Forming Polymer Containing Acetylene Black (Poor Solvent Precipitation Method). A core-shell-type electrode material A4 was prepared in the same manner as in Production Example 2 described above, except that the active material of Production Example 2 described above (carbon-coated $LiCoO_2$ particle by the sintering method) was changed to the active material prepared by the above-described method (carbon-coated $LiCoO_2$ particle by the mechanochemical method). The scanning electron microscope (SEM) photograph (magnification of 5000) of the obtained core-shell-type electrode material (positive electrode material) A4 is shown in FIG. 7.

Comparative Production Example 1

A core-shell-type electrode material C-A1 was prepared in the same manner as in Production Example 2 described above, except that the active material of Production Example 2 described above (carbon-coated $LiCoO_2$ particle by the sintering method) was changed to $LiCoO_2$ particle which was not carbon-coated. However, when the obtained core-shell-type electrode material (positive electrode material) C-A1 was observed by a scanning electron microscope (SEM) photograph (magnification of 5000), it was not confirmed that the surface of the active material was coated with the gel-forming polymer.

Example 1

Preparation of Test Electrode (Positive Electrode). 85 parts by mass of the electrode material (positive electrode material) A1 obtained in Production Example 2 described above, 10 parts by mass of acetylene black as a conductive aid, and 5 parts by mass of carboxymethyl cellulose (CMC) as a binder were mixed with one another. Then, water as a solvent for controlling slurry viscosity was added thereto in an appropriate amount, and then was mixed with a stirrer, thereby obtaining a positive electrode active material slurry.

Meanwhile, an aluminum foil (thickness: 20 μm) was prepared as a positive electrode current collector. Further, the positive electrode active material slurry prepared above was applied to one surface of the positive electrode current collector such that an amount of the active material applied became 10 mg/$cm^2$ to thereby form a coating film. Then, this coating film was dried at 80° C. for 60 minutes and then dried under vacuum for 6 hours. Thereafter, the obtained positive electrode was punched using a punch to have a circle shape of φ16 mm, thereby obtaining a test electrode (positive electrode) B1.

Example 2

In Example 1 described above, the electrode material (positive electrode material) A1 was changed to 86 parts by mass of the electrode material (positive electrode material) A2 obtained in Production Example 3 described above, and the binder was changed to 2 parts by mass of carboxymethyl cellulose (CMC) and 2 parts by mass of styrene-butadiene rubber (SBR). Except the above changes, a test electrode (positive electrode) B2 was obtained in the same manner as in Example 1 described above.

Example 3

A test electrode (positive electrode) B3 was obtained in the same manner as in Example 2 described above, except that, in Example 2 described above, the electrode material (positive electrode material) A2 was changed to the electrode material (positive electrode material) A3 obtained in Production Example 4 described above.

Example 4

A test electrode (positive electrode) B4 was obtained in the same manner as in Example 1 described above, except that, in Example 1 described above, the electrode material (positive electrode material) A1 was changed to the electrode material (positive electrode material) A4 obtained in Production Example 5 described above.

Comparative Example 1

85 parts by mass of carbon-coated $LiCoO_2$ as a positive electrode active material (provided that, it was prepared in Production Example 2 and was not coated with a gel-forming polymer), 10 parts by mass of acetylene black as a conductive aid, and 5 parts by mass of carboxymethyl cellulose (CMC) as a binder were mixed with one another, thereby obtaining a positive electrode active material slurry.

Meanwhile, an aluminum foil (thickness: 20 μm) was prepared as a positive electrode current collector. Further, the positive electrode active material slurry prepared above was applied to one surface of the positive electrode current collector such that an amount of the active material applied became 10 mg/$cm^2$ to thereby form a coating film. Then, this coating film was dried at 80° C. for 60 minutes and then dried under vacuum for 6 hours. Thereafter, the obtained positive electrode was punched using a punch to have a circle shape of φ16 mm, thereby obtaining a test electrode (positive electrode) C-B1.

Comparative Example 2

A test electrode (positive electrode) C-B2 was prepared in the same manner as in Example 2 described above, except that, in Example 2 described above, the electrode material (positive electrode material) A2 was changed to an electrode material which had not been carbon-coated in Production Example 3 described above (that is, non-treated $LiFePO_4$ particle).

Comparative Example 3

A test electrode (positive electrode) C-B3 was prepared in the same manner as in Example 3 described above, except that, in Example 3 described above, the electrode material (positive electrode material) A3 was changed to an electrode material which had not been carbon-coated in Production Example 4 described above (that is, non-treated $Li_4Ti_5O_{12}$ particle).

<<Evaluation of Internal Resistance of Test Electrode (Negative Electrode)>>:

Preparation of Coin-Sized Battery. First, a lithium metal foil (thickness: 500 μm, φ17 mm) as a counter electrode was disposed in an HS cell made of stainless steel (manufactured by Hohsen Corp.), a separator (thickness: 25 μm, θ18 mm) formed by a polypropylene microporous membrane was placed thereon, and any one of the test electrodes (negative electrodes) produced in the Examples and Comparative Examples described above was placed thereon. To a power generating element obtained in this way, 200 μL of a liquid electrolyte of 1M LiPF$_6$/EC+DEC (1:1 (volume ratio)) was injected, a spacer, a spring, and an upper cover were superimposed in this order, and the upper cover was fixed with a wing nut, thereby obtaining a coin-sized battery corresponding to each of the Examples and Comparative Examples.

<<Evaluation of Internal Resistance by Alternating Current Impedance Measurement>>:

The coin-sized batteries produced as described above were charged for 4 hours in total under the condition of constant current-constant voltage (CC-CV) such that the upper limit voltage was set to 4.2 V, the lower limit voltage was set to 3.0 V and the current was set to 0.5 C as for the LiCoO$_2$-based electrode. Further, as for the LiFePO$_4$-based electrode, the upper limit voltage was set to 4.0 V and the lower limit voltage was set to 3.0 V. Next, after the constant current discharge was performed to the lower limit voltage at 0.5 C, the battery was charged to have 50% of the charging state, and then the alternating current impedance of the cell was measured from 20 kHz to 0.1 Hz. Regarding a real number component at 0.3 Hz immediately before the influence of diffusion acted (the real number component corresponds to the internal resistance of the battery), the values thereof were read. The ratio of the obtained values was obtained and evaluated as a ratio of the value of the internal resistance of the cell of Example to the value of the internal resistance of the corresponding comparative cell. The results thereof are presented together in Table 1. Incidentally, regarding the Li$_4$Ti$_5$O$_{12}$ electrode battery, in a battery in which a Li counter electrode was used as a positive electrode, since the initial state was the charging state, the same measurement was performed in such a manner that after the lower limit voltage was set to 1.0 V, the upper limit voltage was set to 2.0 V, and discharge was performed under CC-CV in an initial period, charge was then performed until 2.0 V, and discharge was performed to have 50% of the charging state.

internal resistance of the battery, and further, it is possible to lead the way to provide a battery with excellent rate characteristics and a high output density. As such, it can be said that the invention of the present application by which a battery with a high output density can be provided based on the technical idea considerably different from the related art has extremely high superiority and is creative.

The invention claimed is:

1. An electrode material for a non-aqueous electrolyte secondary battery used for a non-aqueous electrolyte secondary battery using a liquid electrolyte, a gel polymer electrolyte, or an ionic liquid electrolyte, the electrode material comprising:
   a core part in which at least a part of a surface of an electrode active material is coated with a first conductive material; and
   a shell part in which a second conductive material is contained in a base material formed by a gel-forming polymer having a tensile elongation at break of 10% or more in a gel state.

2. The electrode material for a non-aqueous electrolyte secondary battery according to claim 1, wherein the gel-forming polymer is a polyurethane resin.

3. The electrode material for a non-aqueous electrolyte secondary battery according to claim 2, wherein the polyurethane resin is the one obtained by reaction of polyethylene glycol and an isocyanate compound.

4. The electrode material for a non-aqueous electrolyte secondary battery according to claim 1, wherein the electrode active material is a metal oxide.

5. The electrode material for a non-aqueous electrolyte secondary battery according to claim 1, wherein the first conductive material is a carbon material.

6. A non-aqueous electrolyte secondary battery electrode obtained by forming an electrode active material layer on a surface of a current collector, the electrode active material layer comprising an electrode material, the electrode material comprising:

TABLE 1

| Cell | Comparative cell | Electrode active material | Ratio of internal resistance of cell to comparative cell | Difference between cell and comparative cell | | | |
|---|---|---|---|---|---|---|---|
| | | | | Carbon coating | | Gel-forming polymer | |
| | | | | Example | Comparative Example | Example | Comparative Example |
| Example 1 | Comparative Example 1 | LiCoO$_2$ | 0.61 | Present (sintering method) | Present (sintering method) | Present | Absent |
| Example 2 | Comparative Example 2 | LiFePO$_4$ | 0.81 | Present (sintering method) | Absent | Present | Absent |
| Example 3 | Comparative Example 3 | Li$_4$Ti$_5$O$_{12}$ | 0.75 | Present (sintering method) | Absent | Present | Absent |
| Example 4 | Comparative Example 1 | LiCoO$_2$ | 0.86 | Present (mechanochemical method) | Present (sintering method) | Present | Absent |

As understood from the result of Table 1, it is found that, according to the embodiment of the present invention, the internal resistance can be lowered as compared to the corresponding Comparative Example.

In this connection, when the electrode material and the agent for inhibiting an increase in internal resistance according to the present invention are used in a non-aqueous electrolyte secondary battery, it is possible to lower the a core part in which at least a part of a surface of an electrode active material is coated with a first conductive material; and
a shell part in which a second conductive material is contained in a base material formed by a gel-forming polymer having a tensile elongation at break of 10% or more in a gel state.

7. The non-aqueous electrolyte secondary battery electrode according to claim 6, wherein the electrode active material layer comprises a binder, and the binder is an aqueous binder.

8. The non-aqueous electrolyte secondary battery electrode according to claim 6, wherein the current collector comprises a conductive resin layer formed by a resin having conductivity.

9. A non-aqueous electrolyte secondary battery comprising a power generating element,
the power generating element comprising:
the electrode set forth in claim 6;
another electrode having a polarity different from that of the electrode; and
an electrolyte layer interposed between active material layers of these two electrodes.

10. The non-aqueous electrolyte secondary battery according to claim 9, wherein the electrolyte layer comprises a liquid electrolyte, a polymer gel electrolyte, or an ionic liquid electrolyte.

11. The non-aqueous electrolyte secondary battery according to claim 9 wherein the battery is a bipolar type lithium ion secondary battery.

12. A method for producing an electrode material for a non-aqueous electrolyte secondary battery, the method comprising a coating step of coating a core part, in which at least a part of a surface of an electrode active material is coated with a first conductive material, with a shell part in which a second conductive material is contained in a base material formed by a gel-forming polymer having a tensile elongation at break of 10% or more in a gel state.

13. The producing method according to claim 12, further comprising:
a step of preparing a mixture containing the base material and the second conductive material in advance before the coating step,
wherein the coating step comprises a step of coating the core part with the mixture.

* * * * *